(12) United States Patent
Goto et al.

(10) Patent No.: US 11,077,549 B2
(45) Date of Patent: Aug. 3, 2021

(54) ROBOT AND ROBOT SYSTEM

(71) Applicant: Seiko Epson Corporation, Tokyo (JP)

(72) Inventors: Yoshinobu Goto, Matsumoto (JP); Takuya Owa, Shen Zhen (CN)

(73) Assignee: Seiko Epson Corporation

(*) Notice: Subject to any disclaimer, the term of this patent is extended or adjusted under 35 U.S.C. 154(b) by 409 days.

(21) Appl. No.: 16/180,212

(22) Filed: Nov. 5, 2018

(65) Prior Publication Data

US 2019/0134810 A1 May 9, 2019

(30) Foreign Application Priority Data

Nov. 6, 2017 (JP) .............................. JP2017-213522

(51) Int. Cl.
| | |
|---|---|
| *B25J 19/00* | (2006.01) |
| *B25J 9/04* | (2006.01) |
| *B25J 9/10* | (2006.01) |
| *B25J 9/12* | (2006.01) |
| *B25J 13/08* | (2006.01) |
| *B25J 18/00* | (2006.01) |
| *B25J 9/00* | (2006.01) |

(52) U.S. Cl.
CPC ............. *B25J 9/047* (2013.01); *B25J 9/0009* (2013.01); *B25J 9/102* (2013.01); *B25J 9/104* (2013.01); *B25J 9/12* (2013.01); *B25J 13/088* (2013.01); *B25J 18/005* (2013.01); *B25J 19/0029* (2013.01)

(58) Field of Classification Search
CPC . B25J 9/0009; B25J 9/047; B25J 9/102; B25J 9/104; B25J 9/12; B25J 19/0029
See application file for complete search history.

(56) References Cited

U.S. PATENT DOCUMENTS

| | | | | |
|---|---|---|---|---|
| 5,007,784 A | * | 4/1991 | Genov | B25J 9/042 198/471.1 |
| 5,178,031 A | * | 1/1993 | Orsi | B25J 9/1025 318/568.11 |
| 6,324,934 B1 | * | 12/2001 | Monaghan | B25J 9/042 74/490.04 |
| 6,893,204 B1 | * | 5/2005 | Suzuki | B65G 49/067 414/744.5 |

(Continued)

FOREIGN PATENT DOCUMENTS

| | | |
|---|---|---|
| JP | 2007-237342 A | 9/2007 |
| JP | 2011-218488 A | 11/2011 |

*Primary Examiner* — William C Joyce
(74) *Attorney, Agent, or Firm* — Harness, Dickey & Pierce, P.L.C.

(57) ABSTRACT

A robot includes a robot main body including a base and a robot arm, a drive unit that drives the robot arm, and a wiring electrically connected to the drive unit, in which the robot arm includes a casing including a main body and a cover detachably connected to the main body, the drive unit includes a first pulley, a second pulley having a hollow hole, a belt connecting the first pulley and the second pulley, and a motor that generates a driving force for driving the robot arm and rotates the first pulley or the second pulley by the driving force, the wiring includes an insertion area inserted through the hollow hole of the second pulley and an intersection area intersecting with the belt as seen in a direction along a rotation axis of the second pulley.

10 Claims, 13 Drawing Sheets

(56) References Cited

U.S. PATENT DOCUMENTS

| | | | |
|---|---|---|---|
| 7,513,173 B2* | 4/2009 | Ono | B25J 9/1065 |
| | | | 414/917 |
| 9,272,415 B2* | 3/2016 | Nogami | B25J 19/063 |
| 9,647,513 B2* | 5/2017 | Park | H02K 11/21 |
| 2005/0079042 A1* | 4/2005 | Maeda | B25J 9/101 |
| | | | 414/744.2 |
| 2005/0193854 A1* | 9/2005 | Sanemasa | H02G 11/00 |
| | | | 74/490.02 |
| 2011/0262257 A1* | 10/2011 | Hino | B25J 19/0029 |
| | | | 414/744.5 |
| 2013/0195599 A1* | 8/2013 | Furuichi | B25J 9/0009 |
| | | | 414/744.5 |

\* cited by examiner

ROBOT AND ROBOT SYSTEM

BACKGROUND

1. Technical Field

The present invention relates to a robot and a robot system.

2. Related Art

In the related art, an industrial robot that performs various works on a work target is known. Such an industrial robot includes, for example, a base, a robot arm provided so as to be pivotable with respect to the base, and a drive unit provided in the robot arm and driving the robot arm.

For example, in JP-A-2007-237342, a robot including a first arm, a second arm provided on the first arm via a joint, and a wrist portion provided at a tip end portion of the second arm is disclosed. The robot also includes a motor for driving the wrist portion and a reduction gear coaxially connected to the motor, and the wrist portion is configured to operate by timing belt drive.

In such a robot, a motor and the reduction gear are provided on one side of a region surrounded by the timing belt, and the wrist portion is provided on the other side. A cable connected to the motor passes through the inside of the timing belt and is routed to the wrist portion.

However, in the robot described in JP-A-2007-237342, there is a problem that the belt cannot be replaced unless the cable is removed, which results in poor assemblability.

SUMMARY

An advantage of some aspects of the invention is to solve at least a part of the problems described above, and the invention can be implemented as the following application examples or forms.

A robot according to an application example includes a robot main body that includes a base and a robot arm pivotably connected to the base, a drive unit that is disposed inside the robot arm and drives the robot arm, and a wiring that is disposed inside the robot arm and electrically connected to the drive unit, in which the robot arm includes a casing including a main body and a cover detachably connected to the main body, the drive unit includes a first pulley, a second pulley having a hollow hole, a belt connecting the first pulley and the second pulley, and a motor that generates a driving force for driving the robot arm and rotates the first pulley or the second pulley by the driving force, the wiring includes an insertion area inserted through the hollow hole of the second pulley and an intersection area intersecting with the belt as seen in a direction along a rotation axis of the second pulley, and the intersection area is positioned between the belt and the main body.

According to such a robot, it is possible to detach or attach the belt from or to the first pulley and the second pulley without removing the wiring. For that reason, it is possible to easily replace the belt, and it is possible to improve assemblability.

In the robot according to the application example, it is preferable that a fixture that fixes the wiring is provided in the main body.

With this configuration, it is possible to further reduce interference by the wiring when the belt is detached or attached.

In the robot according to the application example, it is preferable that a first fixture which serves as the fixture and is disposed inside the belt and a second fixture which serves as the fixture and is disposed outside the belt are provided in the main body, as seen in a direction along a rotation axis of the second pulley.

With this configuration, it is possible to more reliably reduce interference by the intersection area of wiring and the vicinity thereof when the belt detached or attached.

In the robot according to the application example, it is preferable that the drive unit includes a reduction gear having a through-hole through which the wiring is inserted, the first pulley is attached to the motor, the second pulley is attached to the reduction gear so that the hollow hole and the through-hole communicate with each other, and the motor and the reduction gear are positioned on a side of the main body with respect to the belt.

With this configuration, for example, by detaching the cover, it is possible to easily perform a replacement operation of the belt without removing the motor and the reduction gear.

In the robot according to the application example, it is preferable that the robot arm is provided with an A arm including the casing and a B arm connected to the A arm and pivotable with respect to the A arm, the robot arm includes a drive unit for the A arm which serves as the drive unit driving the A arm, and a drive unit for the B arm which serves as the drive unit driving the B arm, and the drive unit for the A arm and the drive unit for the B arm are provided on the A arm.

With this configuration, it is possible to replace the belt included in each of the drive units for the A arm and drive unit for the B arm without detaching the wiring, and more easily assemble the drive unit for the A arm and the drive unit for the B arm.

In the robot according to the application example, it is preferable that the robot includes a drive board that is disposed inside the robot arm and drives the drive unit.

With this configuration, as compared with the case where the drive board is provided on the base, the drive board can be disposed in the vicinity of the drive unit provided inside the robot arm, so that electrical connection between the drive board and the drive unit can be made easier.

In the robot according to the application example, it is preferable that the drive unit is attached to the main body, and the drive board is attached to the cover.

With this configuration, by removing the cover from the main body, it is possible to replace the drive board or the like. For that reason, it is possible to improve assemblability and maintainability.

In the robot according to the application example, it is preferable to include a control board and a power supply board that supplies electric power to the control board, which are provided in the robot main body.

With this configuration, since the control board having the function of the controller, the power supply board, and the robot main body are integrated, the degree of freedom of disposition of the robot can be made higher than that in the case where the robot main body and the controller are separate bodies.

A robot system according to an application example includes a robot including a robot main body that includes a base and a robot arm pivotably connected to the base, a drive unit that is disposed inside the robot arm and drives the robot arm, and a wiring that is disposed inside the robot arm and electrically connected to the drive unit, and a control device provided separately from the robot and including a control board and a power supply board for supplying electric power to the control board, in which the robot arm includes a casing including a main body and a cover detachably connected to the main body, the drive unit includes a first pulley, a second pulley having a hollow hole, a belt connecting the first pulley and the second pulley, and a motor that generates a driving force for driving the robot arm and rotates the first pulley or the second pulley by the driving force, the wiring includes an insertion area inserted through the hollow hole of the second pulley and an intersection area intersecting with the belt as seen in a direction along a rotation axis of the second pulley, and the intersection area is positioned between the belt and the main body.

According to such a robot, it is possible to detach or attach the belt from or to the first pulley and the second pulley even without removing the wiring. For that reason, it is possible to easily replace the belt, and it is possible to improve assemblability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot and a robot system according to the invention will be described in detail based on preferred embodiments illustrated in the accompanying drawings.

First Embodiment

Figure 1:
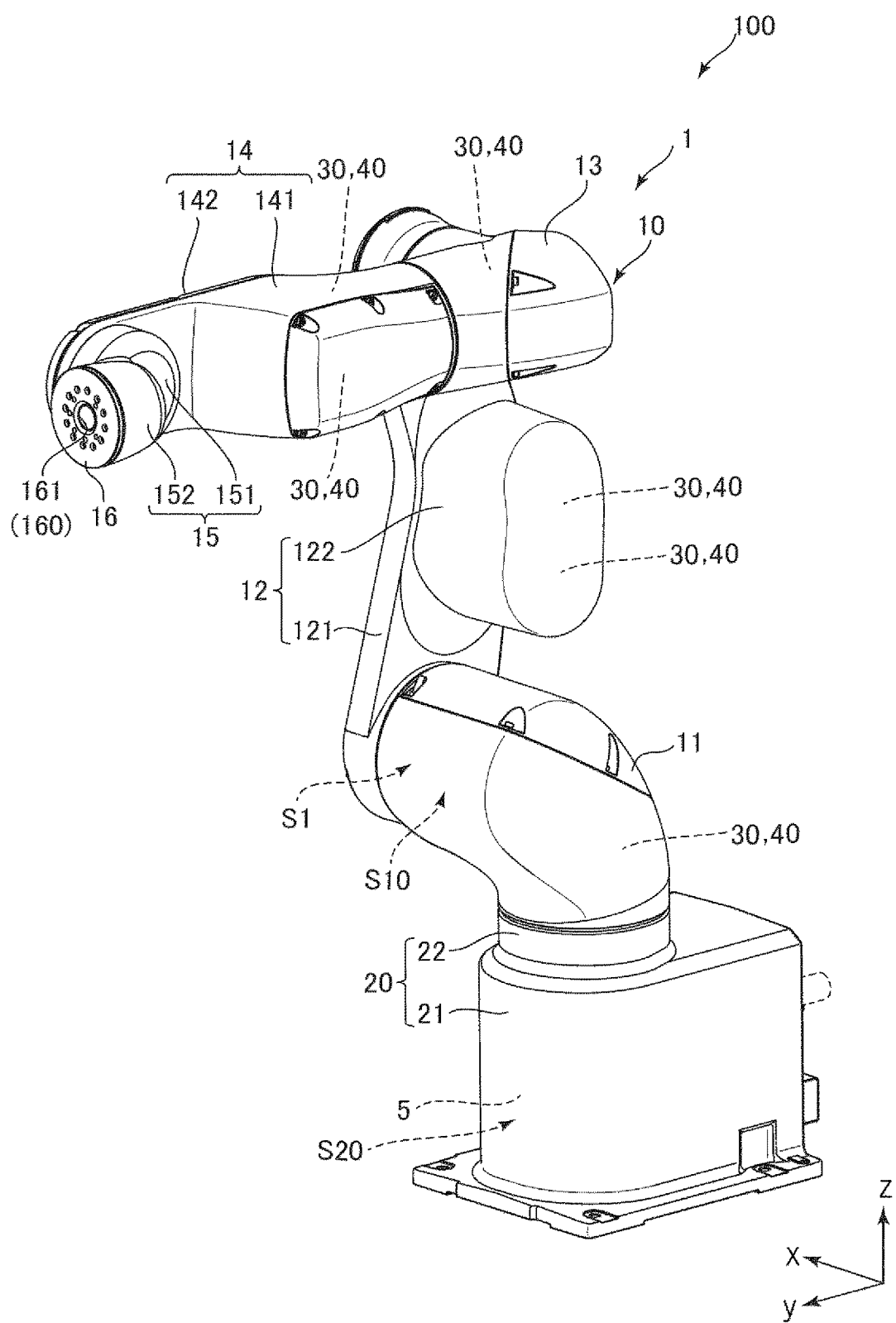
FIG. 1 is a perspective view illustrating a robot according to a first embodiment.
Figure 2:
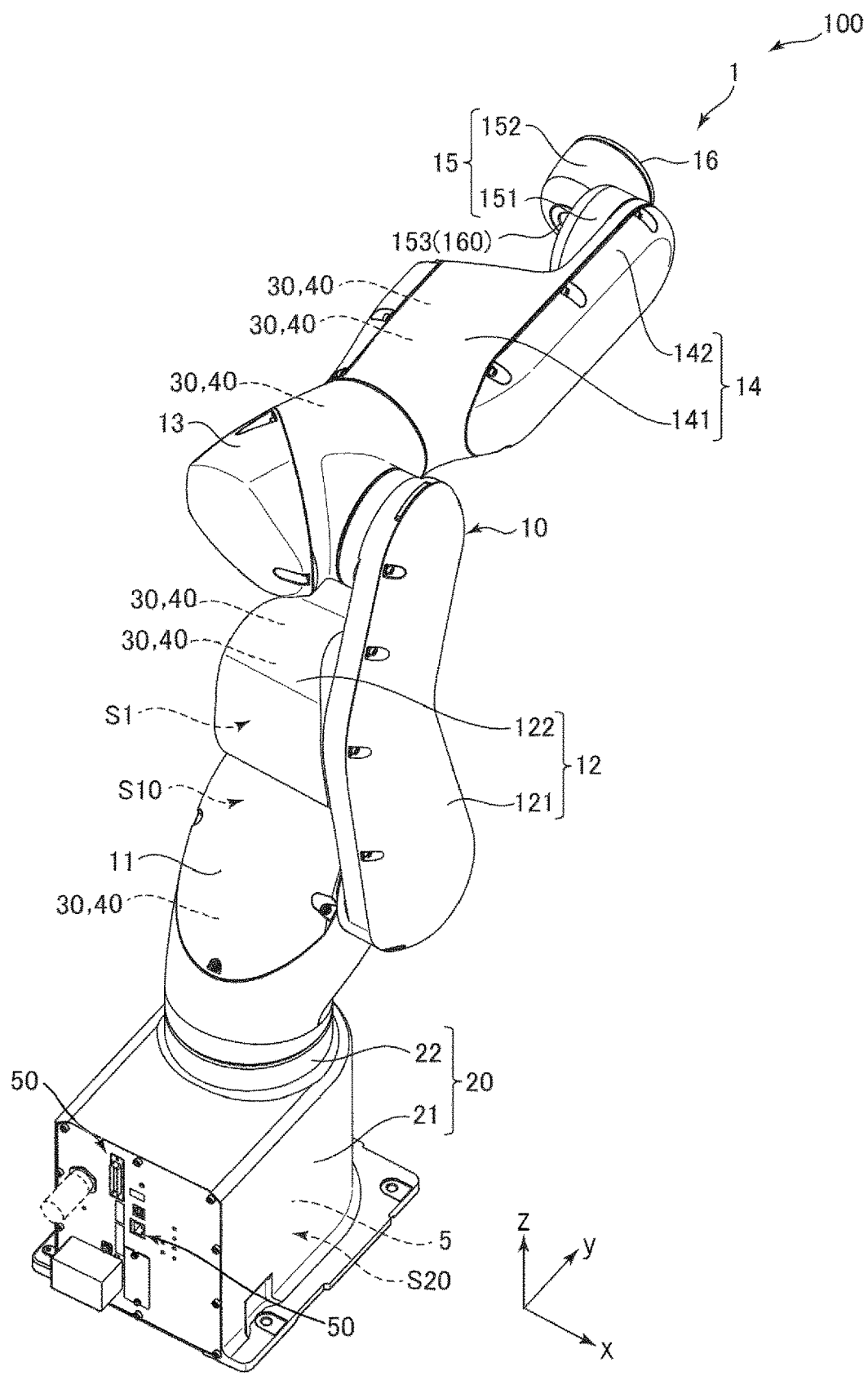
FIG. 2 is a perspective view of the robot illustrated in FIG. 1 as seen in a direction different from that in FIG. 1.
Figure 3:
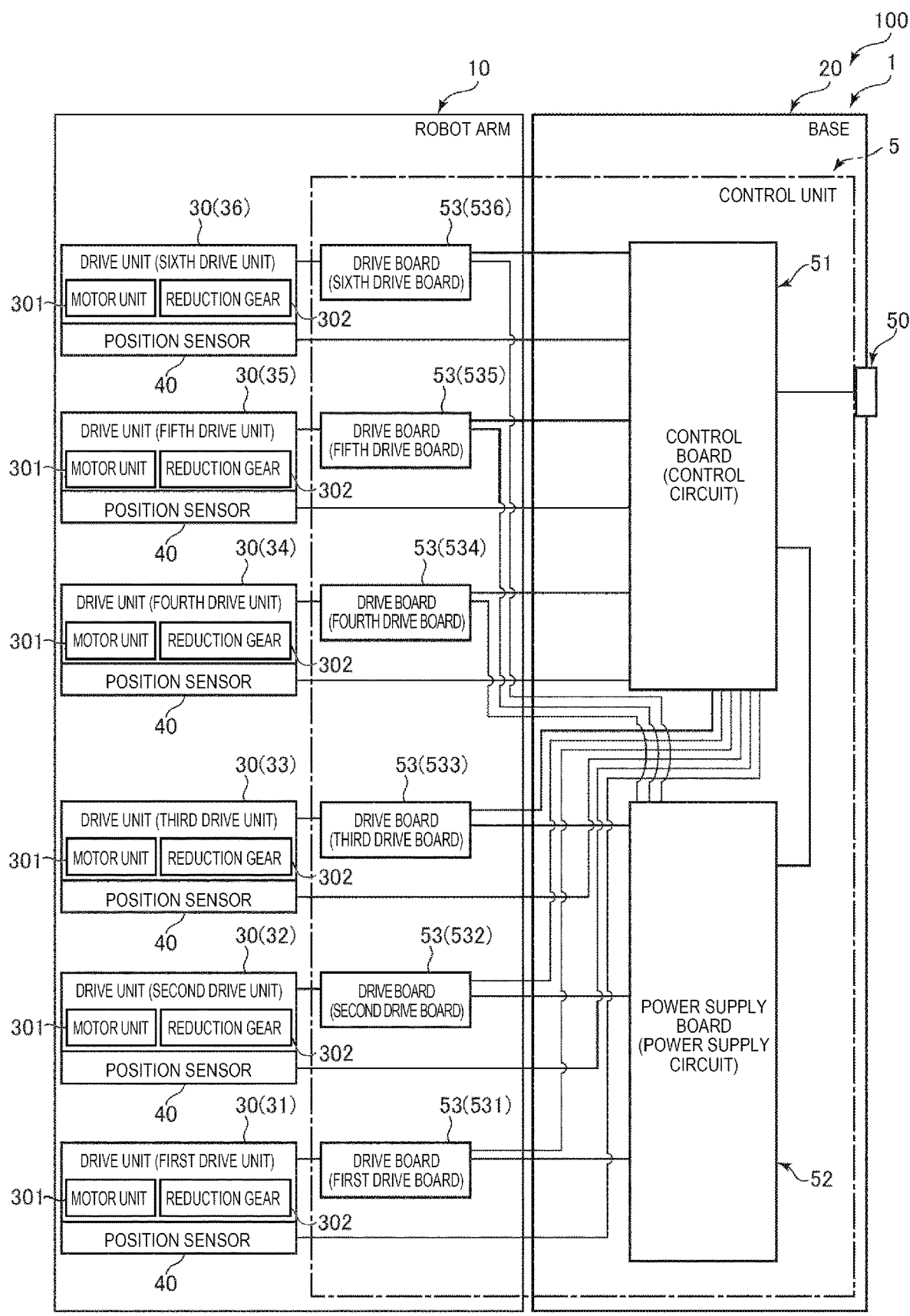
FIG. 3 is a block diagram of the robot illustrated in FIG. 1.
Figure 4:
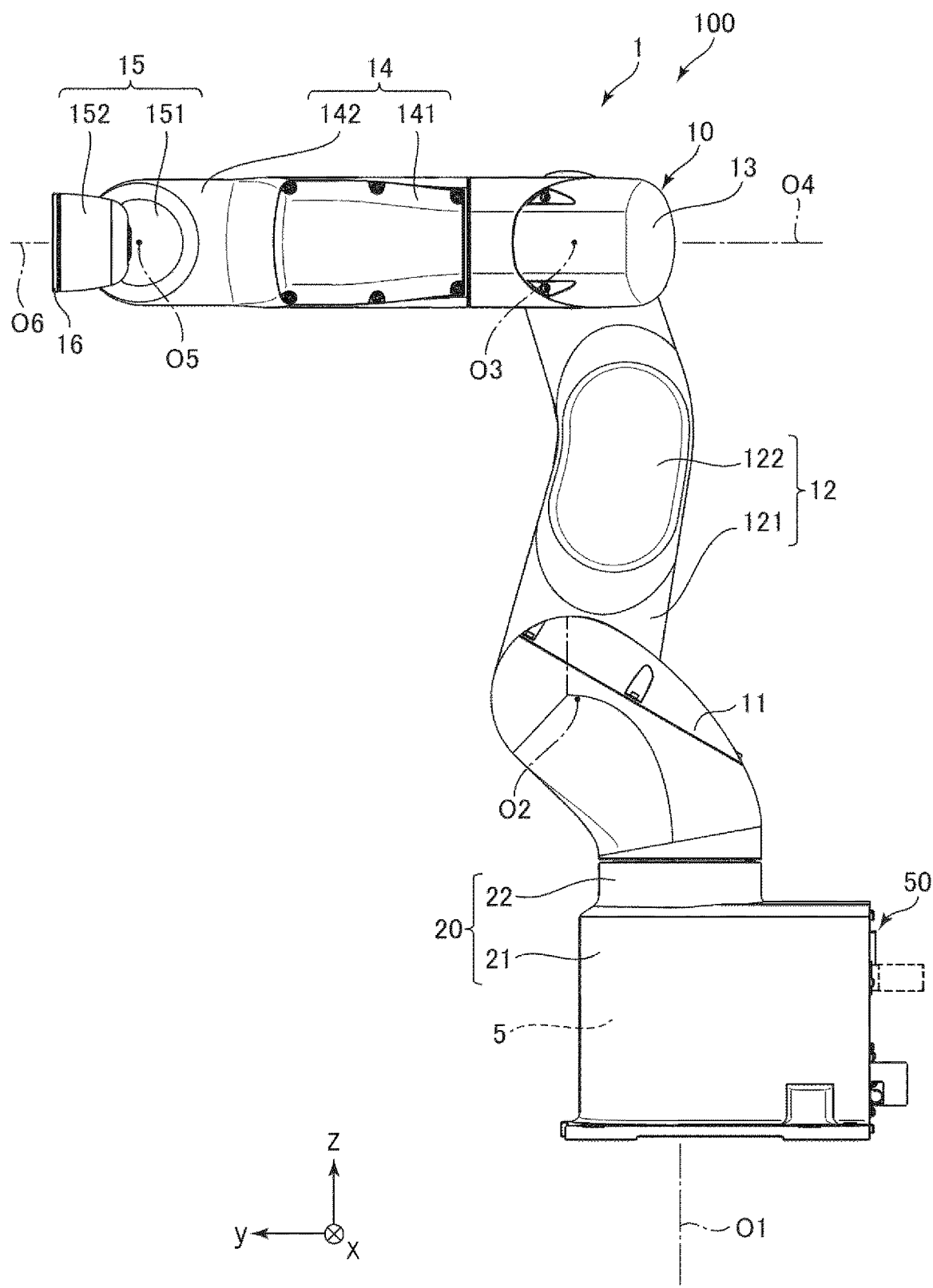
FIG. 4 is a view of the robot illustrated in FIG. 1 as seen from the −x-axis side.
Figure 5:
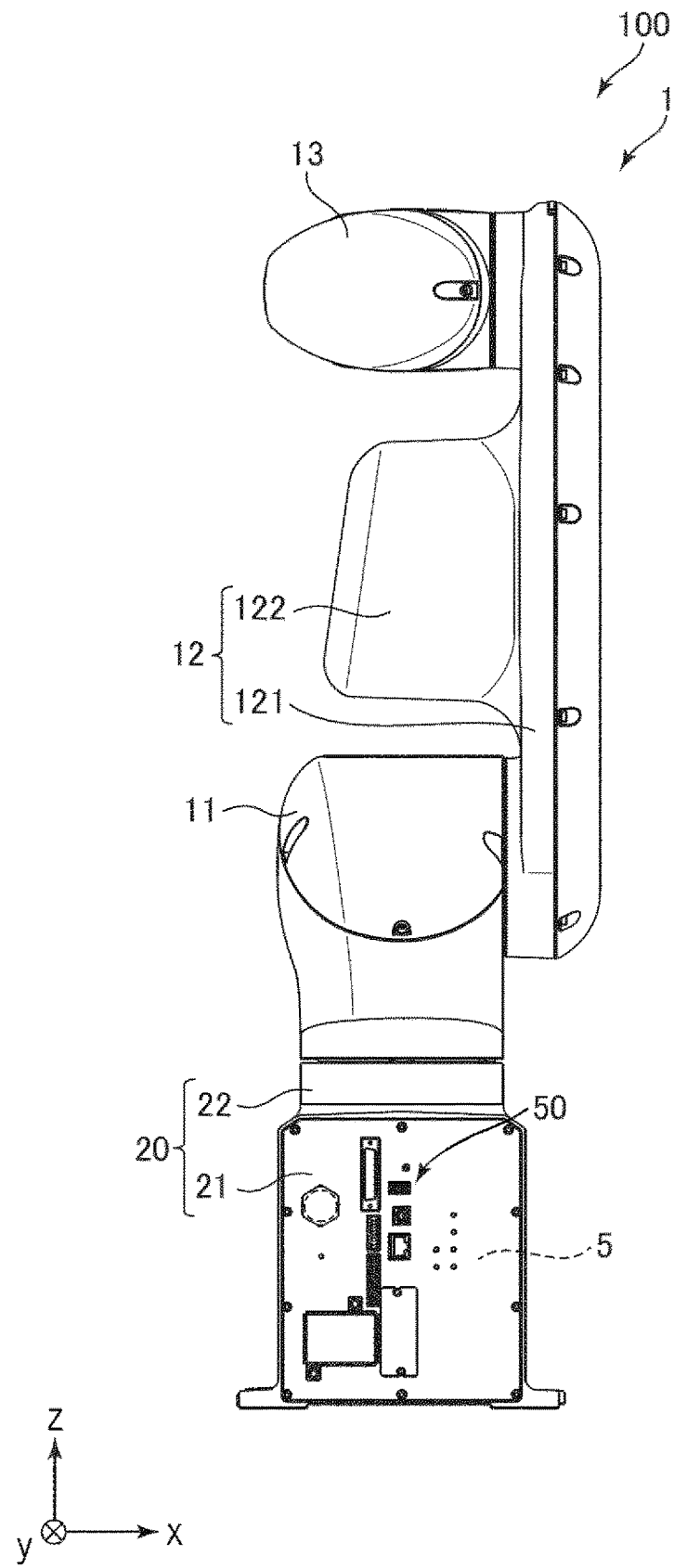
FIG. 5 is a view of the robot illustrated in FIG. 1 as seen from the −y-axis side.
Figure 6:
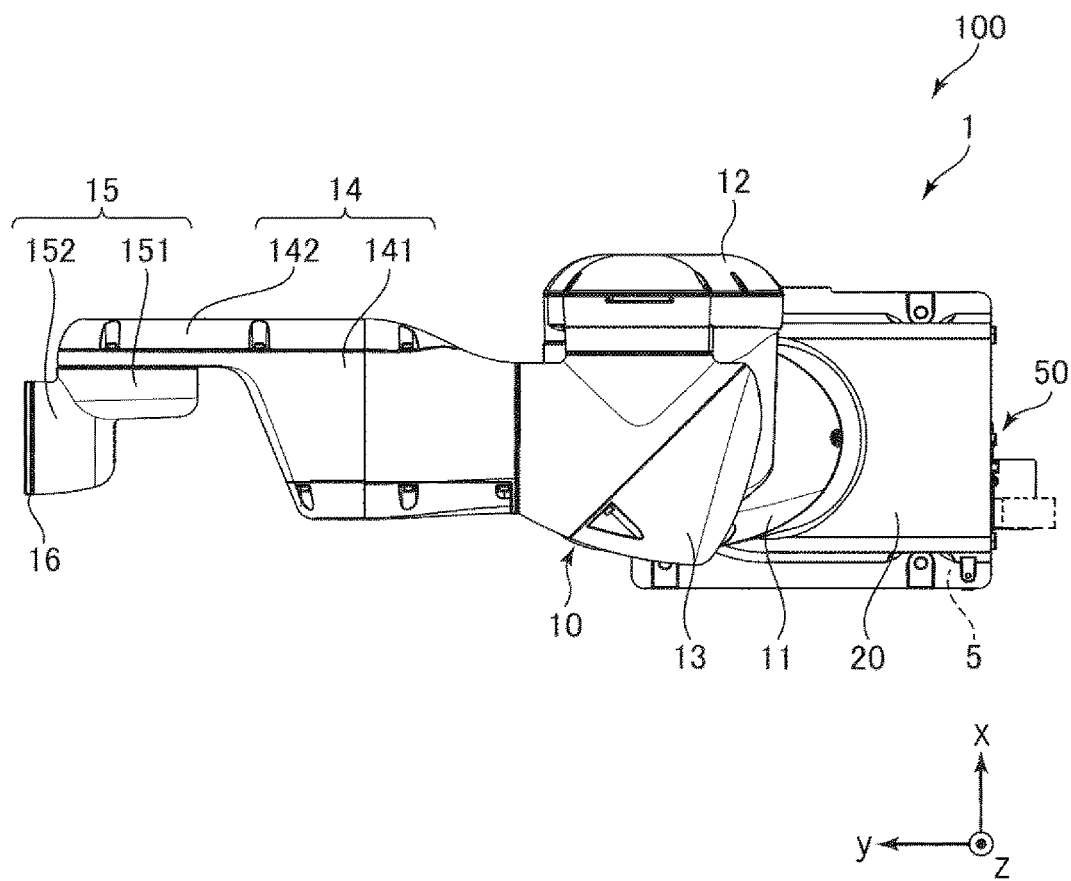
FIG. 6 is a view of the robot illustrated in FIG. 1 as seen from the +z-axis side.
Figure 7:
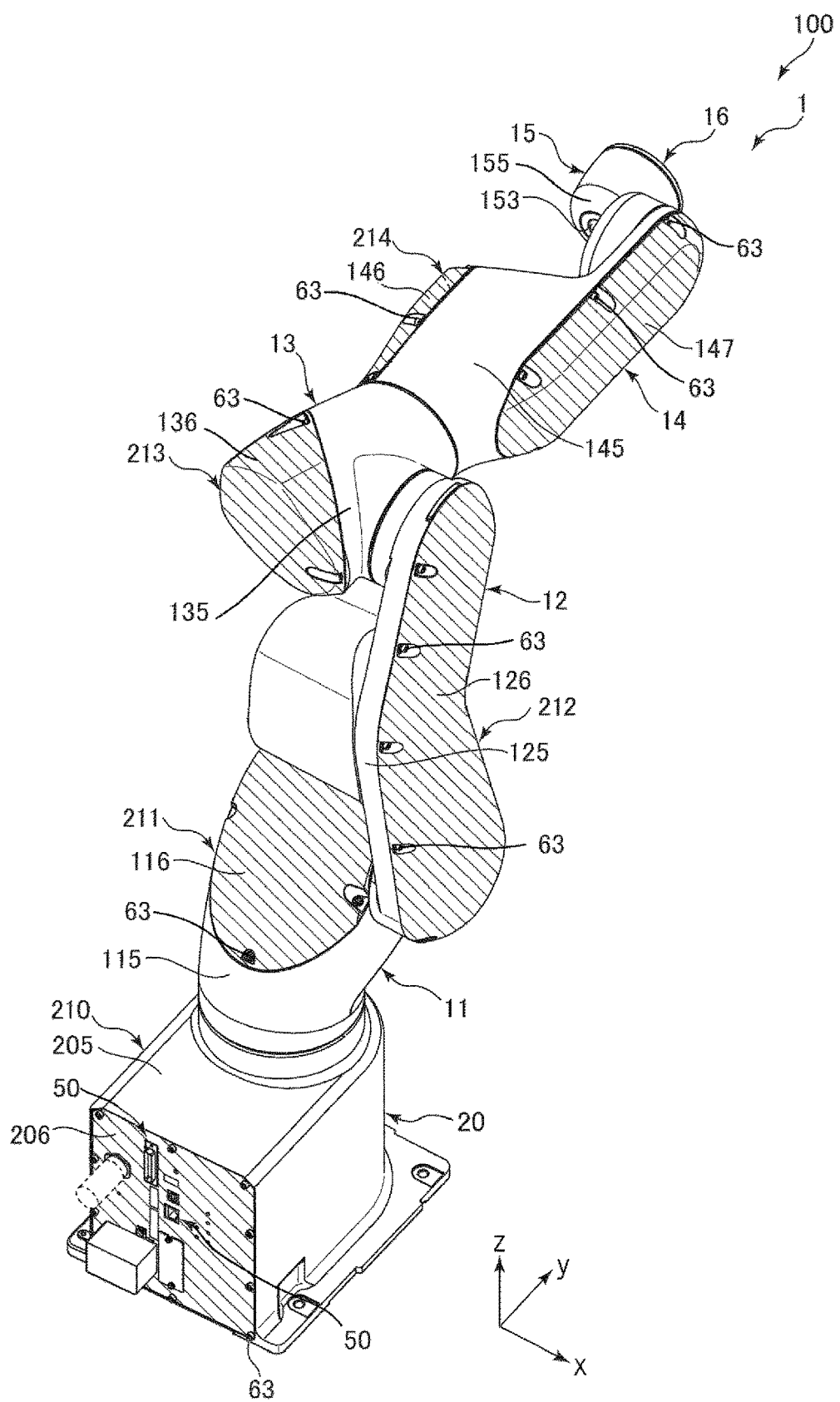
FIG. 7 is a view for explaining a plurality of housings and covers included in the robot.
Figure 8:
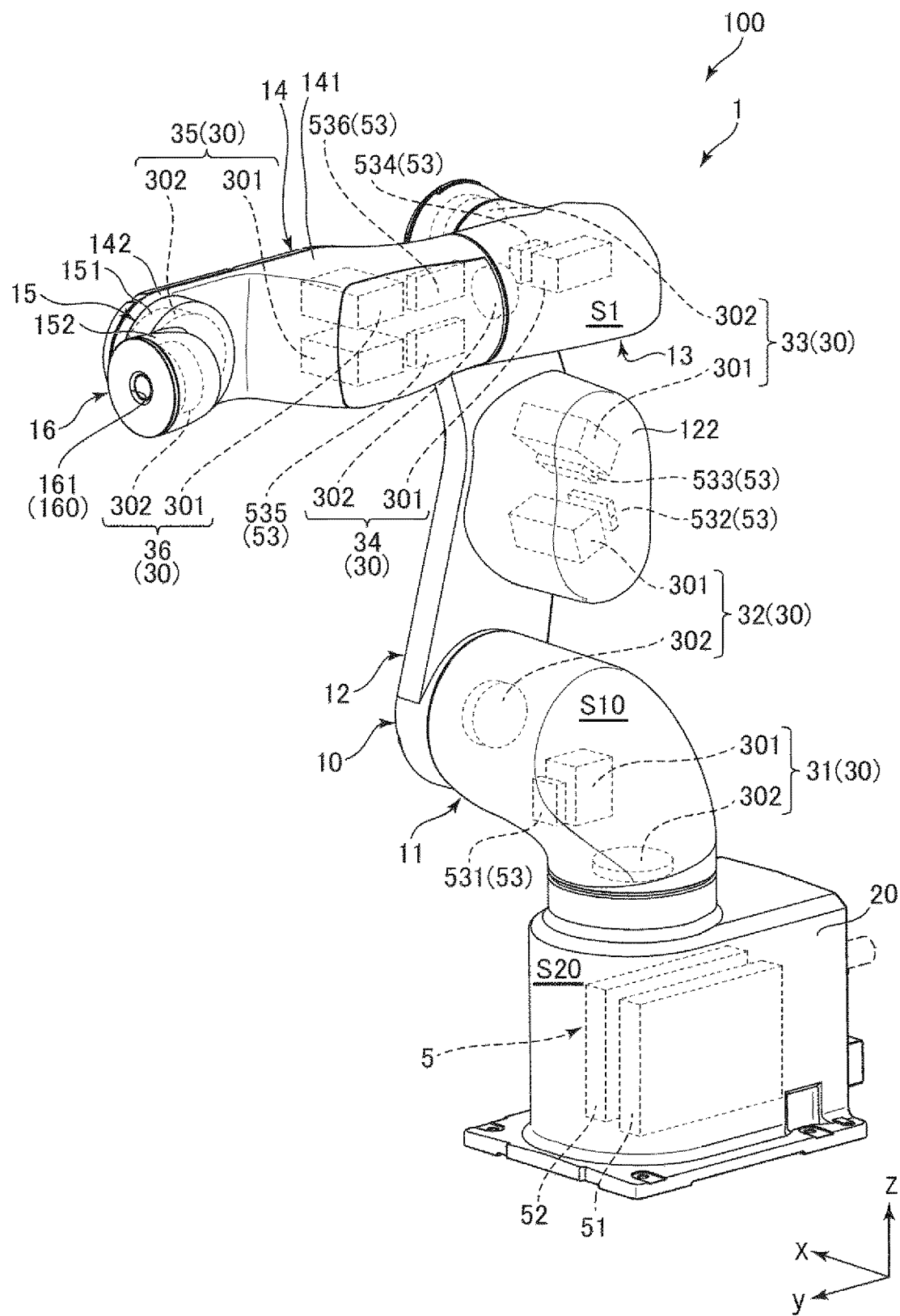
FIG. 8 is a perspective view schematically illustrating the interior of a robot main body included in the robot.

FIG. 1 is a perspective view illustrating a robot according to a first embodiment. FIG. 2 is a perspective view of the robot illustrated in FIG. 1 as seen in a direction different from that in FIG. 1. FIG. 3 is a block diagram of the robot illustrated in FIG. 1. FIG. 4 is a view of the robot illustrated in FIG. 1 as seen from the −x-axis side. FIG. 5 is a view of the robot illustrated in FIG. 1 as seen from the −y-axis side. FIG. 6 is a view of the robot illustrated in FIG. 1 as seen from the +z-axis side. FIG. 7 is a view for explaining a plurality of housings and covers included in the robot. FIG. 8 is a perspective view schematically illustrating the interior of a robot main body included in the robot.

For convenience of description, in each of FIGS. 1, 2, and 4 to 8, x, y, and z axes are illustrated as three axes orthogonal to each other in the following description, and the tip end side of the arrow indicating each axis is defined as "+", and the base end side thereof is defined as "−". Also, a direction parallel to the x-axis is referred to as the "x-axis direction", a direction parallel to the y-axis is referred to as the "y-axis direction", and a direction parallel to the z-axis is referred to as "z-axis direction". The base 20 side of a robot 100 illustrated in FIG. 1 is referred to as a "base end", and the opposite side (sixth arm 16 side) is referred to as a "tip end". The upper side in FIG. 4 is referred to as "upper" and the lower side is referred to as "lower". Further, the up-and-down direction in FIG. 4 is defined as the "vertical direction", and the right-and-left direction is defined as the "horizontal direction".

Also, in this specification, the term "horizontal" includes a case where an inclination is within a range of ±5 degrees or less with respect to the horizontal. Similarly, the term "vertical" includes a case where an inclination is within a range of ±5 degrees or less with respect to the vertical. Also, the term "parallel" includes not only a case where two lines (including axes) or planes are perfectly parallel to each other but also a case where two lines (including axes) or planes are inclined within ±5 degrees. The term "orthogonal" includes not only a case where two lines (including axes) or planes intersect each other at an angle of 90° but also a case where an inclination is within ±5 degrees with respect to 90°.

The robot 100 illustrated in FIGS. 1 and 2 is a so-called six-axis vertical articulated robot. The robot 100 can be used, for example, in a manufacturing process for manufacturing precision instruments such as wristwatches. In the following, a basic configuration of the robot 100 will be described.

The robot 100 includes a robot main body 1 and a plurality of drive units 30, a plurality of position sensors 40, and a control unit 5 (control device) that are built in the robot main body 1 (see FIGS. 1 to 3).

In this specification, the orientation of the robot 100 illustrated in FIG. 1 (the same orientation in FIGS. 2 and 4 to 8) is referred to as "basic orientation". In addition, for convenience of description, unless otherwise mentioned, in the description on a disposition relationship of the respective portions of the robot 100, description will be made based on the robot 100 in a stationary state in the basic orientation.

Robot Main Body

As illustrated in FIGS. 1 and 2, the robot main body 1 includes a base 20 and a robot arm 10 connected to the base 20.

Base

The base 20 is a portion for attaching the robot 100 to any installation place. The installation place of the base 20 is not particularly limited, and may be, for example, a floor, a wall, a ceiling, a work stand, a movable carriage, and the like. The base 20 includes a main body 21 having a rectangular parallelepiped outer shape and a protruding portion 22 provided on the +z-axis side of the main body 21 and having a columnar outer shape.

Robot Arm

The robot arm 10 is rotatably supported on the base 20, and includes a first arm 11, a second arm 12 (A arm), a third arm 13 (B arm), a fourth arm 14, a fifth 15, and a sixth arm 16 (tip end arm). These arms of the first arm 11, the second arm 12, the third arm 13, the fourth arm 14, the fifth arm 15, and the sixth arm 16 are connected in this order from the base end side to the tip end side, and are configured so as to be rotatable relative to the adjacent base end side arm or the base 20.

As illustrated in FIG. 4, the first arm 11 is connected to the protruding portion 22 of the base 20, and is rotatable around the rotational axis O1 along the vertical direction with respect to the base 20. The first arm 11 has a shape extending obliquely upward from the base 20 and the tip end portion of the first arm 11 protrudes outward from the base 20 as seen in the z-axis direction.

As illustrated in FIGS. 4 and 5, the second arm 12 is connected to a portion on the +x-axis side of the tip end portion of the first arm 11, and is rotatably movable with respect to the first arm 11 around a rotation axis O2 along a horizontal direction. The second arm 12 has a longitudinal shape in which the central portion is bent as seen in the x-axis direction, and includes a flat portion 121 having a shape extending from the first arm 11 toward the third arm 13 and a protruding portion 122 protruding from the central portion of the flat portion 121 toward the −x-axis direction. The protruding portion 122 is separated from the first arm 11 so as not to contact the first arm 11 even when the second arm 12 rotates.

As illustrated in FIGS. 4, 5, and 6, the third arm 13 is connected to a surface (portion) on the same −x-axis side as the surface of the flat portion 121 on which the first arm 11 is provided and is rotatable around a r rotation axis O3 along the horizontal direction with respect to the second arm 12. The third arm 13 has a shape protruding from the second arm 12 in the −x-axis direction. In addition, the third arm 13 is connected to the second arm 12 so as not to contact the protruding portion 122.

As illustrated in FIG. 4, the fourth arm 14 is connected to the tip end portion of the third arm 13 and is rotatable around a rotation axis O4 orthogonal to the rotation axis O3 with respect to the third arm 13. As illustrated in FIG. 6, the fourth arm 14 has a shape extending in the +y-axis direction from the third arm 13, and the length (width) of the fourth arm 14 in the x-axis direction gradually decreases in the +x-axis direction (one side in the width direction of the fourth arm 14) while orienting from the base end side to the tip end side in the middle. Such a fourth arm 14 includes a base end side portion 141 and a tip end side portion 142 whose length in the x-axis direction is shorter than that of the base end side portion 141.

As illustrated in FIG. 4, the fifth arm 15 is connected to the −x-axis side portion of the tip end side portion 142, and is rotatable around the rotation axis O5 orthogonal to the rotation axis O4 with respect to the fourth arm 14. As illustrated in FIGS. 4 and 6, the fifth arm 15 includes a first portion 151 protruding from the tip end portion of the fourth arm 14 in the −x-axis direction and a second portion 152 connected to the first portion 151. The outer shape of the first portion 151 is a columnar shape. On the other hand, the outer shape of the second portion 152 is cylindrical and has a hole 153 penetrating along the y-axis direction (see FIG. 2). As illustrated in FIG. 6, the portion on the +x-axis side of the center line of the second portion 152 is connected to the base end portion of the first portion 151. In the embodiment, the first portion 151 and the second portion 152 are integrally formed.

As illustrated in FIG. 4, the sixth arm 16 is connected to the base end portion of the fifth arm 15, and is rotatable around the rotation axis O6 orthogonal to the rotation axis O5 with respect to the fifth arm 15. The sixth arm 16 is in the shape of a disk and includes a hole 161 penetrating along the y-axis direction in the center portion thereof (see FIG. 1). The hole 161 communicates with the hole 153 of the second portion 152 of the fifth arm 15, and the hole 161 and the hole 153 constitute a through-hole 160 (see FIGS. 1 and 2). Although not illustrated, such a sixth arm 16 is configured so as to be able to allow attachment of an end effector for performing various work such as gripping, for example, on a work target. In this case, wiring (not illustrated) for transmitting the driving force to the end effector can be inserted through the through-hole 160. For example, the sixth arm 16 may be configured so that a force detection device (force sensor), although not illustrated, for detecting a force (including moment) applied to the end effector can be attached. In this case, it is preferable to provide the force detection device between the end effector and the sixth arm 16.

Such a robot main body 1 is configured to include a plurality of exterior members (housings and covers), and an internal space S1 that accommodates the plurality of drive units 30, the plurality of position sensors 40, and the control unit 5 is constituted by the plurality of exterior members (see FIG. 7 and FIG. 8). The internal space S1 includes the inside of the base 20, that is, an internal space S20, and the inside of the robot arm 10, that is, an internal space S10, and the internal space S10 and the internal space S20 are in communication with each other (see FIG. 7 and FIG. 8).

As illustrated in FIG. 7, the base 20 includes a casing 210 configured to include a casing 205 (exterior member) and a cover 206 (exterior member), and the cover 206 is fixed to the casing 205 with a screw 63. The first arm 11 includes a casing 211 configured to include a housing 115 and a cover 116, and the second arm 12 includes a casing 214 configured to include a housing 125 and a cover 126, the third arm 13 includes a casing 213 configured to include a housing 135 and a cover 136, and the fourth arm 14 includes a casing 212 configured to include a housing 145, a cover 146, and a cover 147. The covers 116, 126, 136, 146, and 147 (exterior members) are fixed to the corresponding housings 115, 125, 135, and 145 (exterior members) with screws 63. The fifth arm 15 includes a case 155 as an exterior member.

Furthermore, a sealing member made of packing or the like between the respective exterior members is provided to thereby make it possible to airtightly seal the interior (internal space S1) of the robot main body 1. For example, a sealing member is provided between the housing 115 and the cover 116 and between the housing 115 and the housing 125 (that is, between the first arm 11 and the second arm 12). With this configuration, the robot main body 1 can exhibit excellent waterproof performance and dustproof performance. For that reason, it is possible to suitably use the robot 100 even in an environment in which dust, water, cutting oil or the like falls.

The basic configuration of the robot main body 1 has been briefly described as above. As described above, the robot 100 including the robot main body 1 having such a configuration is a vertical articulated robot including six (plural)

arms of the first arm 11, the second arm 12, the third arm 13, the fourth arm 14, the fifth arm 15 and the sixth arm 16. That is, the robot 100 has six rotation axes O1 to O6, and is a robot with six degrees of freedom. For that reason, the driving range of the tip end portion of the robot arm 10 is wide, so that high workability can be exhibited. In the embodiment, the number of arms included in the robot 100 is six, but the number of arms may be one to five, or may be seven or more. However, in order to precisely position the end effector (not illustrated) provided at the tip end of the robot arm 10 at the intended place in the three-dimensional space, it is preferable that the number of arms (number of rotation axes) is at least six.

As described above, the fifth arm 15 is connected to a portion on the −x-axis side of the portion 142 of the fourth arm 14. As such, the fifth arm 15 is not configured to be supported at both ends as sandwiched by the fourth arm 14, but is cantilevered off the fourth arm 14. With this configuration, as compared with a case where the fifth arm 15 is supported at both ends by the fourth arm 14, the configuration of the fourth arm 14 and the fifth arm 15 can be simplified and the cost can be reduced. Furthermore, as described above, the second arm 12 is connected to a portion on the +x-axis side of the tip end side portion of the first arm 11. As such, the second arm 12 is not configured to be supported at both ends by the first arm 11, but is cantilevered off the first arm 11. With this configuration, as compared with the case where the second arm 12 is supported at both ends by the first arm 11, the configuration of the first arm 11 and second arm 12 can be simplified and the cost can be reduced. As described above, in the embodiment, there are a plurality (two) of cantilevered arms. For that reason, the configuration of the robot arm 10 can be simplified, and the cost can be greatly reduced.

In the embodiment, the volume of the inside of the base 20 is equal to or smaller than the volume of the robot arm 10. For that reason, the degree of freedom of installation of the base 20 can be increased.

Drive Unit

As illustrated in FIG. 3, the robot 100 includes the same number (six in the embodiment) of drive units 30 as the arms of first arm 11, second arm 12, third arm 13, fourth arm 14, fifth arm 15, and sixth arm 16. Each of the plurality of drive units 30 has a function of rotating the corresponding arm with respect to the arm (or base 20) positioned on the base end side thereof, and includes a motor unit 301 including a motor as a power source and a brake, a power transmission mechanism (not illustrated) including a reduction gear 302, a belt (not illustrated), a pulley (not illustrated), and the like. As the motor, for example, a servo motor such as an AC servo motor, a DC servo motor or the like can be used. As the reduction gear 302, for example, a wave gear device or the like can be used.

In the embodiment, one drive unit 30 is responsible for driving one arm. Accordingly, the robot 100 includes a first drive unit 31 for driving the first arm 11, a second drive unit 32 for driving the second arm 12, a third drive unit 33 for driving the third arm 13, a fourth drive unit 34 for driving the fourth arm 14, a fifth drive unit 35 for driving the fifth arm 15, and a sixth drive unit 36 for driving the sixth arm 16. In the following description, when the first drive unit 31, the second drive unit 32, the third drive unit 33, the fourth drive unit 34, the fifth drive unit 35, and the sixth drive unit 36 are not distinguished from each other, these drive units are respectively referred to as the drive unit 30.

As illustrated in FIG. 8, each of the motor unit 301 and the reduction gear 302 included in the first drive unit is provided inside the first arm 11. Although not illustrated in detail, the first drive unit 31 includes the motor unit 301, the reduction gear 302, a first pulley (not illustrated) connected to the shaft portion of the motor unit 301, a second pulley (not illustrated) disposed to be spaced apart from the first pulley and connected to the shaft portion of the reduction gear 302, and a belt (not illustrated) wound around the first pulley and the second pulley. Matters substantially the same as those described above are applied to the second drive unit 32, the third drive unit 33, the fourth drive unit 34, the fifth drive unit 35, and the sixth drive unit 36, which will be described later, and the corresponding arm is driven through so-called belt drive.

As illustrated in FIG. 8, the motor unit 301 included in the second drive unit 32 is provided in the protruding portion 122, and the reduction gear 302 included in the second drive unit 32 is provided at a connection portion (joint portion) between the second arm 12 and the first arm 11. The motor unit 301 included in the third drive unit 33 is provided in the protruding portion 122, and the reduction gear 302 included in the third drive unit 33 is provided at a connection portion (joint portion) between the second arm 12 and the third arm 13. Each of the motor unit 301 and the reduction gear 302 included in the fourth drive unit 34 is provided in the third arm 13. The motor unit 301 included in the fifth drive unit 35 is provided in the portion 141 on the base end side of the arm 14 and the reduction gear 302 included in the fifth drive unit 35 is provided in the first portion 151 of the fifth arm 15. The motor unit 301 included in the sixth drive unit 36 is provided in the portion 141 on the base end side of the fourth arm 14 and the reduction gear 302 included in the sixth drive unit 36 is provided in the second portion 152 of the fifth arm 15 (see FIG. 8). Although not illustrated, the sixth drive unit 36 includes a conversion mechanism for converting the transmission direction of the driving force of a bevel gear or the like by 90 degrees.

Position Sensor

As illustrated in FIG. 3, the robot 100 includes the same number of position sensors 40 as that of the drive units 30, and one position sensor 40 (angle sensor) is provided for one drive unit 30. The position sensor 40 detects a rotation angle of the rotation shaft (shaft portion) of the motor unit 301 (specifically, the motor) or the reduction gear 302. With this configuration, it is possible to obtain information such as an angle (orientation) of the arm on the tip end side with respect to the arm on the base end side. As each of these position sensors 40, for example, a rotary encoder or the like can be used. Each position sensor 40 is electrically connected to a control board 51 of the control unit 5 to be described later.

Control Unit

As illustrated in FIG. 3, the control unit 5 includes the control board 51, a power supply board 52 for supplying electric power to the control board 51, a plurality of drive boards 53 for driving the respective drive units 30 based on a command from the control board 51. The control board 51 and the power supply board 52 constitute a control device (controller) that supplies electric power for driving the robot 100 and controls driving of the robot 100.

Control Board

As illustrated in FIG. 8, the control board 51 is provided in the internal space S20 and includes a control circuit (not illustrated) for controlling driving of each portion of the robot 100. The control circuit includes a processor such as a central processing unit (CPU), a volatile memory such as a random access memory (RAM), a nonvolatile memory such as a read only memory (ROM), and the like, and performs control of driving of each portion of the robot 100 and processing such as various arithmetic operations and determinations. For example, the control circuit is capable of executing a predetermined control program, and outputs a control signal to each drive board 53 according to the control program so as to cause the robot 100 (specifically, the robot arm 10) to execute a predetermined operation.

Power Supply Board

As illustrated in FIG. 8, the power supply board 52 is provided in the internal space S20, and includes a power supply circuit (not illustrated) for generating electric power to be supplied to the control board 51 and each drive board 53. The power supply circuit includes a transformer and a noise filter, converts the frequency and voltage of electric power supplied from an external power supply (not illustrated) such as a commercial power supply, and supplies the electric power to the control board 51 and each drive board 53. In particular, in the embodiment, the power supply circuit is provided with a converter for converting an AC voltage output from the external power supply into a DC voltage (drive voltage) of 52 V and outputting the DC voltage (drive voltage) to each drive board 53 or the like.

The control board 51 and the power supply board 52 described above are supported by a support member (not illustrated) made of, for example, a metal plate or the like, and the support member is detachable from the base 20. For that reason, the control board 51 and the power supply board 52 can be taken out together with the support member to the outside of the base 20. With this configuration, for example, maintenance of the control board 51 and the power supply board 52 can be easily performed.

Drive Board

As illustrated in FIG. 8, each of the drive boards 53 is distributed and disposed in the internal space S10, and includes a drive circuit (not illustrated) that receives a control signal from the control board 51 and converts (generates) power into electric power to be supplied to the drive unit 30. The drive circuit includes, for example, an inverter circuit that converts DC power (current) to AC power (current).

In the embodiment, one drive board 53 is provided for one drive unit 30, and the drive board 53 corresponding to each drive unit 30 performs conversion (generation) of electric power to be supplied to the drive unit 30. Accordingly, the robot 100 includes a first drive board 531 corresponding to the first drive unit 31, a second drive board 532 corresponding to the second drive unit 32, a third drive board 533 corresponding to the third drive unit 33, a fourth drive board 534 corresponding to the fourth drive unit 34, a fifth drive board 535 corresponding to the fifth drive unit 35, and a sixth drive board 536 corresponding to the sixth drive unit 36. In the following description, in a case where the first drive board 531, the second drive board 532, the third drive board 533, the fourth drive board 534, the fifth drive board 535, and the sixth drive board 536 are not distinguished from each other, these boards are respectively referred to as the drive board 53.

As illustrated in FIG. 8, the first drive board 531 is provided in the first arm 11, and is provided in the vicinity of the motor unit 301 included in the first drive unit 31. The second drive board 532 is provided in the protruding portion 122 of the second arm 12 and is provided in the vicinity of the motor unit 301 included in the second drive unit 32. The third drive board 533 is provided in the protruding portion 122 of the second arm 12 and is provided in the vicinity of the motor unit 301 included in the third drive unit 33. The fourth drive board 534 is provided in the third arm 13 and is provided in the vicinity of the motor unit 301 included in the fourth drive unit 34. The fifth drive board 535 is provided in the fourth arm 14 and is provided in the vicinity of the motor unit 301 included in the fifth drive unit 35. The sixth drive board 536 is provided inside the fourth arm 14 and is provided in the vicinity of the motor unit 301 included in the sixth drive unit 36.

In the base 20, a plurality of external connection portions 50 constituted by, for example, connectors (see FIG. 7 and the like) are provided. The external connection portion 50 is electrically connected to the control board 51 and the power supply board 52. For example, one external connection portion 50 is a power supply connector for connecting the control board 51 and the power supply board 52 with an external power supply plug (non-connection portion) electrically connected to an external power supply, and electric power is supplied to the robot 100 by connecting an external power plug to the external connection portion 50. With this configuration, the robot 100 can be driven.

As a specific example of such an external connection portion 50, in addition to the power supply connector described above, a connector for inputting and outputting signals to and from various devices such as a teaching pendant used by a worker to give an operation instruction to the robot 100, a connector for outputting a signal to the end effector 80, and a connector for inputting and outputting data relating to a control program, and the like are included.

The basic configuration of the robot 100 has been described as above. As described above, the control unit 5 having the function of the controller is accommodated inside the internal space S1. That is, the robot 100 includes the control board 51 and a power supply board 52 for supplying power to the control board 51, which are provided in the robot main body 1.

With this configuration, since the control unit 5 having the controller function and the robot main body 1 are integrated, there is no need to consider disposition of the controller and the robot main body 1 as in the related art, and the degree of freedom of disposition of the robot 100 can be increased. Further, as compared with the case where the controller is a separate body, it is possible to reduce the total installation area and to save time and effort in connecting the controller.

As described above, the control board 51 and the power supply board 52 are provided in the base 20 of the robot main body 1. With this configuration, it is easy to design the disposition of various wirings (not illustrated) for connecting the control board 51 and the power supply board 52 and each drive board 53. As compared with the case where the control board 51 and the power supply board 52 are provided in the robot arm 10, the control board 51 and the power supply board 52 can be stably disposed, and it is also possible to prevent an increase in load capacity of the tip end portion of the robot arm 10.

As described above, the robot arm 10 includes the first arm 11 rotatably connected to the base 20, and the first drive unit 31 for driving the first arm 11 is provided in the first arm 11. With this configuration, the first drive unit 31 can be kept away from the control board 51 and the like provided in the base 20, as compared with the configuration in which the first drive unit 31 is disposed in the base 20. For that reason, it is possible to reduce thermal runaway caused by heat generated from the first drive unit 31 and heat generated from the control board 51 and the like, so that the robot 100 can be stably driven for a long time. Furthermore, as described above, the robot arm 10 includes the second arm 12 rotatably connected to the first arm 11, and the second drive unit 32 for driving the second arm 12 is provided in the second arm 12. With this configuration, heat generated from the first drive unit 31 and the second drive unit 32 can be eliminated more efficiently.

Further, as described above, the robot arm 10 includes the first arm 11, the second arm 12, the third arm 13, the fourth arm 14, the fifth arm 15, and the sixth arm 16, and a plurality of drive units 30 for independently driving the first arm 11, the second arm 12, the third arm 13, the fourth arm 14, the fifth arm 15, and the sixth arm 16 (plurality of arms) are provided inside the robot arm 10. Then, the plurality of drive units 30 are dispersedly provided in the robot arm 10 (see FIG. 8). With this configuration, since it is possible to disperse heat generated from the drive unit 30, thermal runaway can be reduced, and thus the robot 100 can be stably driven for a long time. The disposition of the plurality of drive units 30 is not limited to the illustrated disposition. The "dispersion" described above includes not only a case where all of the plurality of drive units 30 are disposed separately but also a case where the plurality of drive units 30 are disposed by being divided into at least two groups.

In addition, as described above, the first drive board 531 for driving the first drive unit 31 is provided in the first arm 11 and the second drive board 532 for driving the second drive unit 32 is provided in the second arm 12. With this configuration, connection between the first drive board 531 and the first drive unit 31 and connection between the second drive board 532 and the second drive unit 32 can be made in a simple configuration. Since heat generated from the first drive board 531 and the second drive board 532 can be dispersed, the robot 100 can be stably driven for a long time.

Furthermore, as described above, the plurality of drive boards 53 for independently driving the plurality of drive units 30, respectively, are provided in the robot arm 10. Then, the plurality of drive boards 53 are dispersedly provided in the robot arm 10. With this configuration, it is possible to simplify connection between the drive board 53 and the corresponding drive unit 30, for example, as compared with a configuration in which the plurality of drive units 30 are driven by one drive board 53. Since the plurality of drive boards 53 are dispersedly provided, heat generated from the drive board 53 can be dispersed and thus, the robot 100 can be stably driven for a long time. The disposition of the plurality of drive boards 53 is not limited to the illustrated disposition. The "dispersion" described above includes not only a case where all of the plurality of drive boards 53 are disposed separately but also a case where the plurality of drive boards 53 are disposed by being divided into at least two groups.

As illustrated in the drawing, it is particularly preferable that each drive board 53 is provided in the vicinity of the corresponding drive unit 30. With this configuration, it is possible to remarkably reduce the number of wirings of a power supply system and the number of wirings of a signal system, as compared with the case where the plurality of drive boards 53 are disposed collectively in the base 20.

The robot 100 having the configuration as described above has a fan-less structure. That is, the robot main body 1 is not provided with a fan for generating airflow in the internal space S1. With this configuration, it is possible to realize the robot 100 having excellent sealing performance.

As described above, the power supply board 52 includes a converter that converts an AC voltage output from an external power supply into a DC voltage (a relatively low driving voltage) to thereby make it possible to realize a fanless structure. The robot 100 may be provided with a fan (not illustrated).

Internal Configuration of Second Arm

Figure 9:
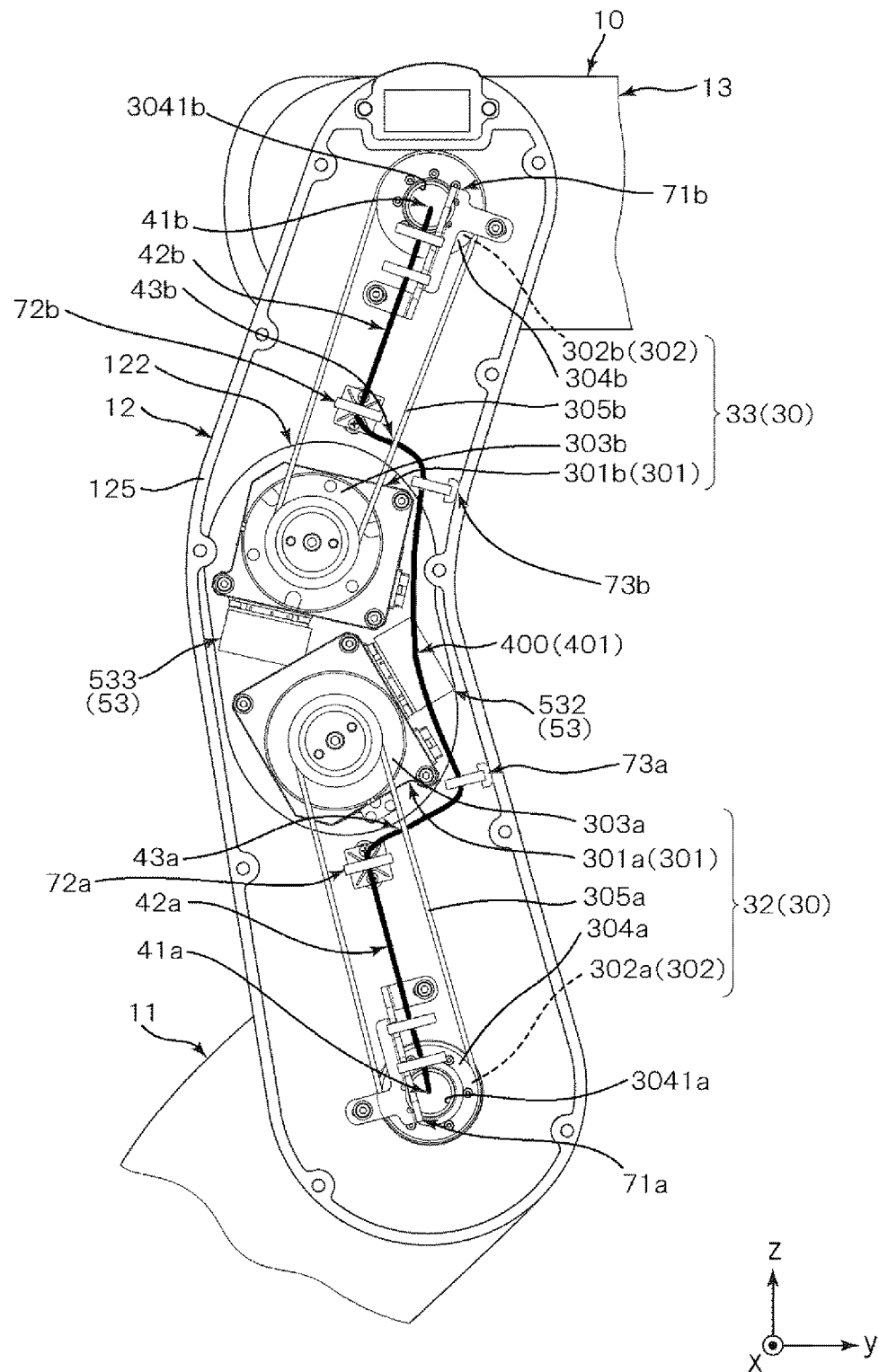
FIG. 9 is a view of the interior of a second arm as seen in the x-axis direction.
Figure 10:
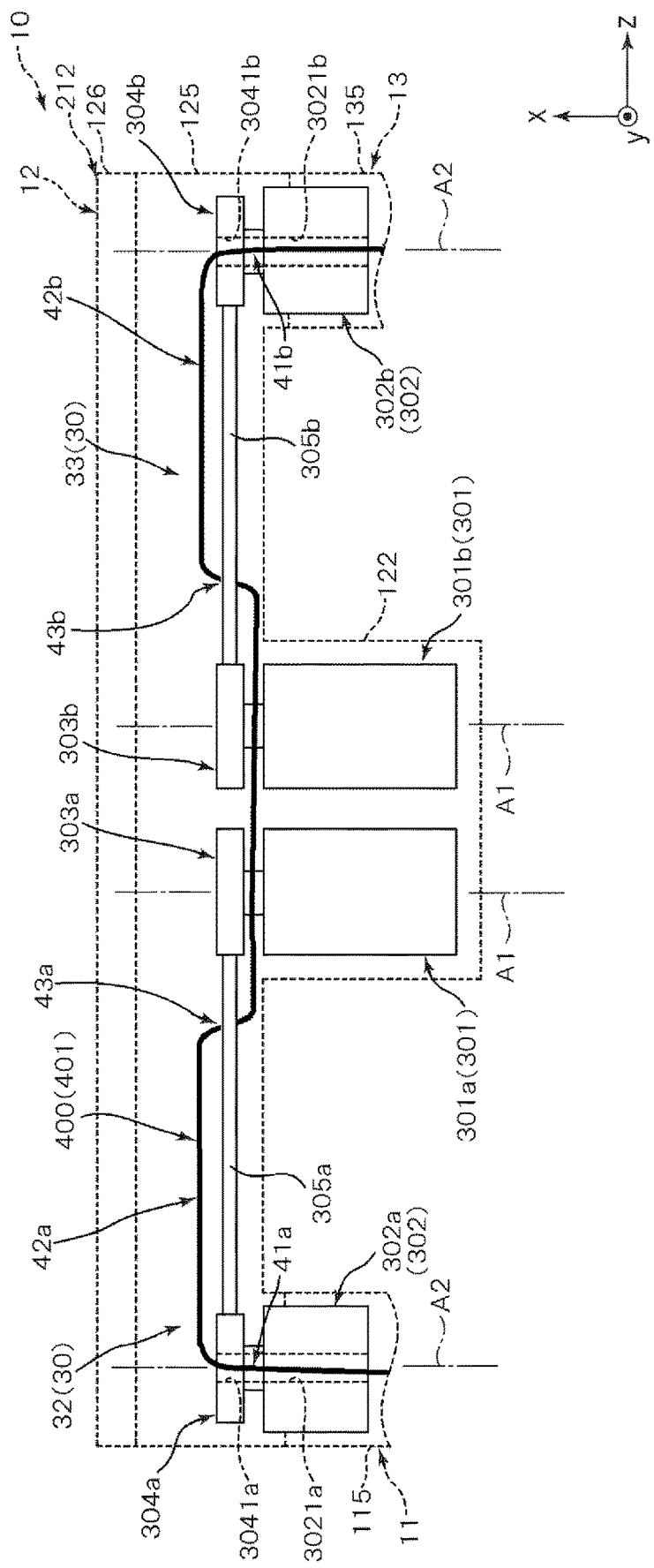
FIG. 10 is a schematic diagram of the interior of the second arm as seen in the y-axis direction.

FIG. 9 is a view of the interior of the second arm as seen in the x-axis direction. FIG. 10 is a schematic diagram of the interior of the second arm as seen in the y-axis direction.

Next, the second arm 12 and the second drive unit 32 and the third drive unit 33 provided inside the second arm 12 will be described in detail.

As illustrated in FIGS. 9 and 10, the second drive unit 32 and the third drive unit 33 are disposed inside the second arm 12.

The second drive unit 32 includes a motor unit 301a (motor unit 301), a reduction gear 302a (reduction gear 302), a first pulley 303a connected to a shaft portion of the motor unit 301a, a second pulley 304a that is disposed to be spaced apart from the first pulley 303a and is connected to the shaft portion of the reduction gear 302a, and a belt 305a wound around the first pulley 303a and the second pulley 304a.

The motor unit 301a is configured to include, for example, a motor, a brake, and the like. The motor unit 301a is disposed at the protruding portion 122 of the second arm 12 and attached to the housing 125 via various members (not illustrated). The first pulley 303a connected to the motor unit 301a is positioned closer to the cover 126 than the motor unit 301a.

The reduction gear 302a is a wave gear device. The reduction gear 302a is disposed at a connection portion (joint portion) between the second arm 12 and the first arm 11. The second pulley 304a connected to the reduction gear 302a is positioned closer to the cover 126 than the reduction gear 302a. For that reason, the belt 305a is also positioned closer to the cover 126 than the reduction gear 302a and the motor unit 301a. The reduction gear 302a includes a through-hole 3021a penetrating along the x-axis direction, and the second pulley 304a also includes a hollow hole 3041a penetrating along the x-axis direction. The through-hole 3021a and the hollow hole 3041a are in communication with each other.

The third drive unit 33 includes a motor unit 301b (motor unit 301), a reduction gear 302b (reduction gear 302), a first pulley 303b connected to a shaft portion of the motor unit 301b, a second pulley 304b that is disposed to be spaced apart from the first pulley 303b and is connected to the shaft portion of the reduction gear 302b, and a belt 305b wound around the first pulley 303b and the second pulley 304b. The third drive unit 33 is disposed on the +z-axis side with respect to the second drive unit 32.

The motor unit 301b is configured to include, for example, a motor, a brake, and the like. The motor unit 301b is disposed at the protruding portion 122 of the second arm 12 and attached to the housing 125 via various members (not illustrated). The first pulley 303b connected to the motor unit 301b is positioned closer to the cover 126 than the motor unit 301b.

The reduction gear 302b is a wave gear device. The reduction gear 302b is disposed at a connection portion (joint portion) between the second arm 12 and the third arm 13. The second pulley 304b connected to the reduction gear 302b is positioned closer to the cover 126 than the reduction gear 302b. For that reason, the belt 305b is also positioned closer to the cover 126 than the reduction gear 302b and the motor unit 301b. The reduction gear 302b includes a through-hole 3021b penetrating along the x-axis direction, and the second pulley 304b also includes the hollow hole 3041b penetrating along the x-axis direction.

A cable 400 is electrically connected to each of the second drive unit 32 and the third drive unit 33. Specifically, the cable 400 includes, for example, a plurality of wirings 401, and although not illustrated in detail, some of the plurality of wirings 401 included in the cable 400 are branched, and are connected to a second drive board 532 electrically connected to the second drive unit 32 and a third drive board 533 electrically connected to the third drive unit 33. Although not illustrated in detail, the cable 400 is electrically connected to the control board 51 and the power supply board 52, and is routed from the inside of the base 20 to the drive units 30 respectively disposed on the first arm 11, the second arm 12, the third arm 13, and the fourth arm 14.

As illustrated in FIG. 10, in the second drive unit 32, the cable 400 is pulled out from the through-hole 3021a and the hollow hole 3041a, passes between the belt 305a and the cover 126 (specifically, the surface on the +x-axis side of the cover 126), runs below the belt 305a in the vicinity of the motor unit 301a, and is pulled out between the belt 305a and the housing 125 (specifically, the surface on the −x-axis side of the housing 125). That is, the cable 400 includes an insertion area 41a inserted through the through-hole 3021a and the hollow hole 3041a, a portion 42a positioned between the belt 305a and the cover 126, and an intersection area 43a intersecting with the belt 305a as seen in (as seen in the x-axis direction) the axial direction of the rotation axis A2 of the second pulley 304a or the axial direction of the rotation axis A1 of the first pulley 303a. In the embodiment, the rotation axis A2 of the second pulley 304a and the rotation axis A1 of the first pulley 303a are parallel.

In the third drive unit 33, the cable 400 runs below the belt 305a from between the belt 305a and the housing 125 in the vicinity of the motor unit 301b and is pulled out between the belt 305b and the cover 126, passes between the belt 305b and the cover 126, and is routed to the hollow hole 3041b and the through-hole 3021b. That is, the cable 400 includes an intersection area 43b intersecting with the belt 305b as seen in the axial direction of the rotation axis A2 of the second pulley 304b or the axial direction of the rotation axis A1 of the first pulley 303b (viewed from the x-axis direction), a portion 42b positioned between the belt 305b and the cover 126, and an insertion area 41b inserted through the through-hole 3021b and the hollow hole 3041b.

As such, the reduction gear 302a includes the through-hole 3021a and the second pulley 304a includes the hollow hole 3041a, and similarly, the reduction gear 302b includes the through-hole 3021b and the second pulley 304b includes the hollow hole 3041b, so that the cable 400 can be inserted through the interior of the robot arm 10. For that reason, there is no need to pull out the cable 400 to the outside of the robot arm 10, and it is possible to prevent the cable 400 from interfering with a peripheral device (not illustrated) or the like.

As illustrated in FIG. 9, the cable 400 is fixed to the housing 125 of the second arm 12 by a plurality of fixtures 71a, 72a, 73a, 71b, 72b, and 73b.

The fixture 71a is provided in a region surrounded by the belt 305a as seen in the x-axis direction, in the vicinity of the hollow hole 3041a. The fixture 72a (first fixture) is provided in the region surrounded by the belt 305a as seen in the x-axis direction in the vicinity of the motor unit 301a, and the fixture 73a (second fixture) is provided outside the region surrounded by the belt 305a as seen in the x-axis direction in the vicinity of the motor unit 301a. Through these fixtures 72a and 73a, the intersection area 43a of the cable 400 does not interfere with the belt 305a.

Similarly, the fixture 71b is provided in a region surrounded by the belt 305b as seen in the x-axis direction, in the vicinity of the hollow hole 3041b. The fixture 72b (first fixture) is provided in the region surrounded by the belt 305b as seen in the x-axis direction in the vicinity of the motor unit 301b, and the fixture 73b (second fixture) is provided outside the region surrounded by the belt 305b as seen in the x-axis direction in the vicinity of the motor unit 301b. Through these fixtures 72b and 73b, the intersection area 43b of the cable 400 does not interfere with the belt 305b.

As such, the second drive unit 32 and the third drive unit 33 are provided in the second arm 12, and the cable 400 is routed to the second drive unit 32 and the third drive unit 33, and the cable 400 is fixed by the plurality of fixtures 71a, 72a, 73a, 71b, 72b, and 73b. With this configuration, the cable 400 can be disposed as illustrated in FIGS. 9 and 10. Then, at the intersection areas 43a and 43b of the cable 400, the belts 305a and 305b are positioned closer to the cover 126 (+x-axis side) than the cable 400. For that reason, even without detaching the cable 400, the belt 305a can be easily removed from the first pulley 303a and the second pulley 304a by pulling the belt 305a toward the +x-axis side. Similarly, even without detaching the cable 400, the belt 305b can be easily removed from the first pulley 303b and the second pulley 304b by pulling the belt 305b toward the +x-axis side. The new belts 305a and 305b can be attached without detaching the cable 400.

The second arm 12 and its interior have been described as above. As described above, the robot 100 includes the robot main body 1 that includes the base 20 and the robot arm 10 rotatably connected to the base 20, the second drive unit 32 which is disposed inside the robot arm 10 and drives the robot arm 10 (specifically, the second arm 12 of the robot arm 10) as a "drive unit", and the wiring 401 (cable 400) that is disposed inside the robot arm 10 and electrically connected to the second drive unit 32 (see FIGS. 8, 9, and 10). The robot arm 10 (specifically, second arm 12) includes the casing 212 including the housing 125 as a "main body" and the cover 126 detachably connected to the housing 125. The second drive unit 32 includes the first pulley 303a, the second pulley 304a having the hollow hole 3041a, the belt 305a connecting the first pulley 303a and the second pulley 304a, and a motor (motor unit 301a including the motor) for generating a driving force for driving the robot arm 10 and rotating the first pulley 303a or the second pulley 304a by the driving force. Further, the wiring 401 (cable 400) includes the insertion area 41a inserted through the hollow hole 3041a of the second pulley 304a and the intersection area 43a intersecting with the belt 305a as seen in a direction along a rotation axis of the second pulley 304a, and the intersection area 43a is positioned between the belt 305a and the housing 125.

According to such a robot 100, the belt 305a can be detached from or attached to the first pulley 303a and the second pulley 304a as described above even without removing the cable 400. For that reason, the belt 305a can be easily replaced, and assemblability of the second drive unit 32 can be enhanced.

Similarly, in the embodiment, the third drive unit 33 which is disposed inside the robot arm 10 and drives the robot arm 10 (specifically, the third arm 13 of the robot arm 10) as a "drive unit" is provided. The third drive unit 33 includes the first pulley 303b, the second pulley 304b having a hollow hole 3041b, the belt 305b connecting the first pulley 303b and the second pulley 304b, and the motor unit 301b including a motor that generates a driving force for driving the robot arm 10 and rotates the first pulley 303b or the second pulley 304b by the driving force. The wiring 401 (cable 400) includes an insertion area 41b inserted through the hollow hole 3041b of the second pulley 304b and the intersection area 43b which intersects the belt 305b as seen in the direction along the rotation axis of the second pulley 304b, and the intersection area 43b is positioned between the belt 305b and the housing 125.

With this configuration, the belt 305b can be detached from or attached to the first pulley 303b and the second pulley 304b even without removing the cable 400. For that reason, the belt 305b can be easily replaced and assemblability of the third drive unit 33 can be enhanced. Accordingly, maintenance of the robot 100 can be performed more easily.

As described above, in the housing 125 serving as the "main body", the fixtures 71a, 72a, 73a, 71b, 72b, and 73b fixed to the wiring 401 (cable 400) are provided.

With this configuration, it is possible to further reduce interference by the wiring when the belts 305a and 305b are detached or attached. For that reason, it is possible to replace the belts 305a, 305b more easily and reliably. Further, in the embodiment, the fixture 71a and the fixture 71b are configured to have the same structure, the fixture 72a and the fixture 72b are configured to have the same structure, and the fixture 73a and the fixture 73b are configured to have the same configuration. For that reason, it is easy to design, and cost reduction can also be achieved.

In the embodiment, as described above, in the robot 100, as viewed (or along the rotation axis A1) from the direction along the rotation axis A2 of the second pulley 304a, the fixture 72a (first fixture) disposed inside the belt 305a and a fixture 73a (second fixture) as a "fixture" disposed outside the belt 305a are provided in the housing 125 as the "main body". Similarly, as seen in the direction along the rotation axis A2, the fixture 72b (first fixture) disposed inside the belt 305b and the fixture 73b (second fixture) disposed outside the belt 305b) are provided.

With this configuration, it is possible to more reliably reduce interference by the intersection areas 43a and 43b of the cable 400 and the vicinity thereof when the belts 305a and 305b are detached or attached. In addition, since interference between the belts 305a and 305b and the cable 400 can be reduced or prevented, it is possible to reduce troubles or the like of the belts 305a and 305b and the cable 400 during operation of the robot arm 10.

As described above, the second drive unit 32 includes the reduction gear 302a having the through-hole 3021a through which the wiring 401 (cable 400) can be inserted, the first pulley 303a is attached to the motor (motor unit 301a), the second pulley 304a is attached to the reduction gear 302a so that the hollow hole 3041a and the through-hole 3021a communicate with each other. Then, the motor (motor unit 301a) and the reduction gear 302a are positioned on the side of the housing 125 as the "main body" with respect to the belt 305a.

As described above, the reduction gear 302a is not integrated with the motor unit 301a, but is provided separately at different positions. By using the through-hole 3021a of the reduction gear 302a, the cable 400 can be disposed relatively easily with respect to the belt 305a as illustrated in FIG. 10. That is, the cable 400 can be relatively easily configured to include the insertion area 41a and the intersection area 43a. With this configuration, as described above, the cover 126 is removed so as to make it possible to remove the belt 305a easily without removing the reduction gear 302a and the motor unit 301a.

Similarly, the third drive unit 33 includes the reduction gear 302b having the through-hole 3021b through which the wiring 401 (cable 400) can be inserted, the first pulley 303b is coaxially disposed with respect to the motor (motor unit 301b), the second pulley 304b is coaxially disposed with respect to the reduction gear 302b so that the hollow hole 3041b and the through-hole 3021b communicate with each other. The motor (motor unit 301b) and the reduction gear 302b are positioned on the side of the housing 125 with respect to the belt 305b. For that reason, in the third drive unit 33, the cable 400 can be relatively easily configured to include the insertion area 41b and the intersection area 43b, so that the belt 305b can be easily detached by detaching the cover 126. The "coaxially" means that the rotation axis A1 of the first pulley 303b and the rotation axis of the motor included in the motor unit 301b coincide with each other or that the rotation axis A2 of the second pulley 304b and the rotation axis of the reduction gear 302b coincide with each other.

As described above, in the embodiment, the reduction gears 302a and 302b are each a wave gear device. With this configuration, it is possible to easily and reliably use the reduction gear 302a having the through-hole 3021a through which the cable 400 can be inserted and the reduction gear 302b having the through-hole 3021b through which the cable 400 can be inserted. The reduction gears 302a and 302b may be reduction gears other than the wave gear device.

The robot arm 10 is provided with the second arm 12 (A arm) including the casing 212, and the third arm 13 (B arm) connected to the second arm 12 and rotatable with respect to the second arm 12, and includes the second drive unit 32 (drive unit for the A arm) for driving the second arm 12 as a "drive unit", and the third drive unit 33 (drive unit for the B arm) for driving the third arm 13 as a "drive unit". The second drive unit 32 and the third drive unit 33 are provided in the second arm 12 (A arm).

With this configuration, it is possible to replace the belts 305a and 305b even without detaching the cable 400, and it is possible to more easily assemble the second drive unit 32 and the third drive unit 33 disposed in the second arm 12. Since the two drive units 30 (second drive unit 32 and third drive unit 33) are disposed in one arm (second arm 12), it is particularly easy to assemble and it is also possible to reduce the number of components in the entire robot 100. By configuring the belts 305a and 305b to have a common structure, design is easy and cost reduction can be achieved.

The two belts 305a and 305b can be pulled out in the same direction (opposite side to the housing 125) by positioning all of the motor units 301a and 301b and reduction gears 302a and 302b on the side of the housing 125 with respect to the belts 305a and 305b. In the embodiment, as described above, the belts 305a and 305b can be pulled out toward the +x-axis side (see FIG. 9). For that reason, it is easy to replace the belts 305a and 305b, thereby making it possible to particularly improve maintainability.

In the description described above, the configuration of the cable 400 in the second drive unit 32 and the third drive unit 33 disposed inside the second arm 12 is described as an example, but the same configuration may be adopted in the other drive unit 30.

Internal Configuration of Fourth Arm

Figure 11:
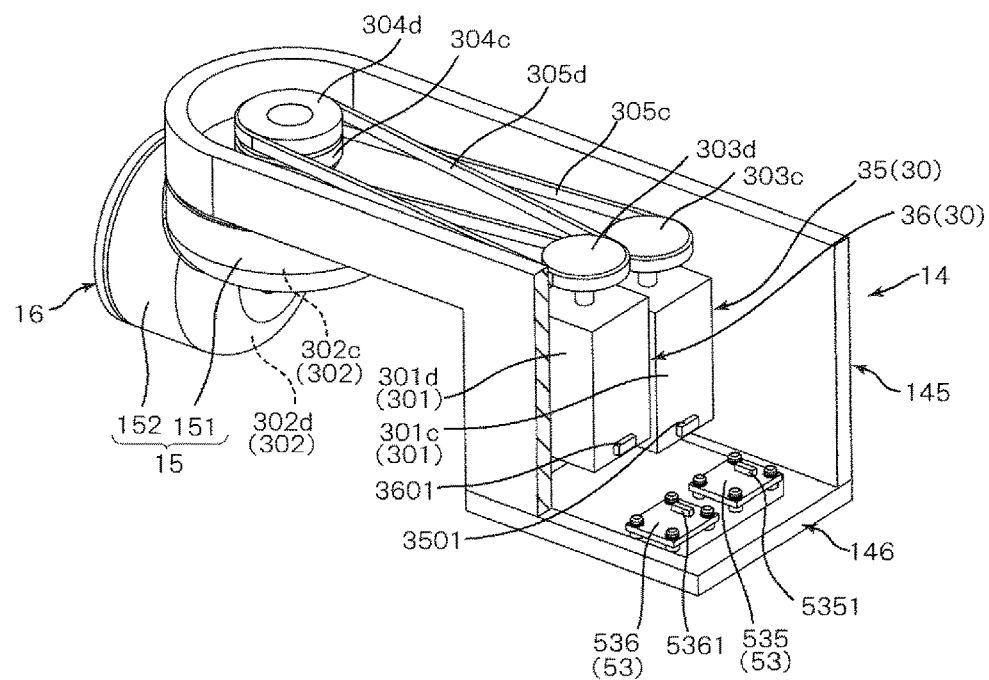
FIG. 11 is a perspective view schematically illustrating the interior of a fourth arm.
Figure 12:
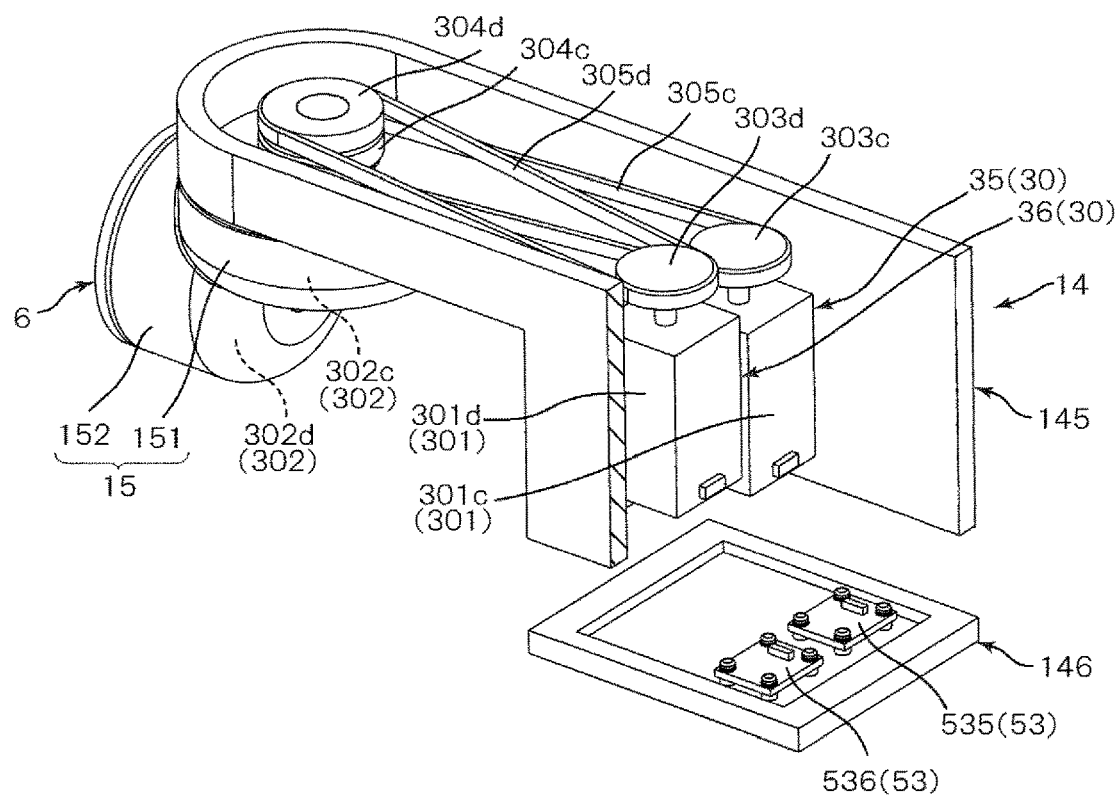
FIG. 12 is a view schematically illustrating a state in which a cover of the fourth arm is detached.

FIG. 11 is a perspective view schematically illustrating the inside of the fourth arm. FIG. 12 is a view schematically illustrating a state in which the cover of the fourth arm is removed. In FIG. 11 and FIG. 12, the cover 146 is illustrated, but illustration of the cover 147 is omitted.

Next, the fifth drive unit 35, the sixth drive unit 36, the fifth drive board 535, and the sixth drive board 536 provided inside the fourth arm 14 will be described in detail.

As illustrated in FIG. 11, the fifth drive unit 35 and the sixth drive unit 36 are disposed inside the fourth arm 14.

The fifth drive unit 35 includes a motor unit 301c (motor unit 301), a reduction gear 302c (reduction gear 302), a first pulley 303c connected to the shaft portion of the motor unit 301c, a second pulley 304c disposed to be spaced apart from the first pulley 303c and connected to the shaft portion of the reduction gear 302c, and a belt 305c wound around the first pulley 303c and the second pulley 304c. The motor unit 301c, the first pulley 303c, the second pulley 304c, and the belt 305c are provided in the fourth arm 14. The reduction gear 302c is provided in the first portion 151 of the fifth arm 15. The motor unit 301c is attached to the housing 145 of the fourth arm 14 via a member (not illustrated). The motor unit 301c is also provided with a connector 3501 in charge of connection with the fifth drive board 535.

The sixth drive unit 36 is provided in the vicinity of the fifth drive unit 35. The sixth drive unit 36 includes a motor unit 301d (motor unit 301), a reduction gear 302d (reduction gear 302), a first pulley 303d connected to the shaft portion of the motor unit 301d, a second pulley 304d disposed to be spaced apart from the first pulley 303d and connected to the shaft portion of the reduction gear 302d, and a belt 305d wound around the first pulley 303d and the second pulley 304d. The motor unit 301d, the first pulley 303d, the second pulley 304d, and the belt 305d are provided in the fourth arm 14. The reduction gear 302d is provided in the second portion 152 of the fifth arm 15. Although not illustrated in detail, the reduction gear 302d is connected to the second pulley 304d by a conversion mechanism constituted with two bevel gears or the like for converting the transmission direction of the driving force by 90°. The motor unit 301d is positioned on a manual operation side of the motor unit 301c in FIG. 11, and is attached to the housing 145 of the fourth arm 14 via a member (not illustrated). The motor unit 301d is provided with a connector 3601 which is in charge of connection with the sixth drive board 536.

As such, the fifth drive unit 35 and the sixth drive unit 36 are provided in the fourth arm 14 so as to make it possible to reduce the size and weight of the fifth arm 15 and the sixth arm 16. For that reason, the weight of the tip end portion of the robot arm 10 can be reduced, and a joint load of the robot arm 10 can be reduced.

The fifth drive board 535 is provided in the vicinity of the fifth drive unit 35. The fifth drive board 535 is detachably attached to the cover 146 of the fourth arm 14. The fifth drive board 535 is provided with a connector 5351 in charge of electrical connection with the fifth drive part 35, and the connector 5351 and the connector 3501 described above are connected by a wiring (not illustrated) or the like.

The sixth drive board 536 is provided in the vicinity of the sixth drive unit 36. The sixth drive board 536 is positioned on the −z-axis side of the fifth drive unit 35, and is detachably attached to the cover 146 of the fourth arm 14. The sixth drive board 536 is provided with a connector 5361 in charge of electrical connection with the sixth drive unit 36, and the connector 5361 and the connector 3601 described above are connected by a wiring (not illustrated) or the like.

As such, the fifth drive board 535 and the sixth drive board 536 are provided on the cover 146, such that the fifth drive board 535 and the sixth drive board 536 can be exposed to the outside together with the cover 146 by removing the cover 146 from the housing 145, as illustrated in FIG. 12. For that reason, it is possible to easily perform maintenance, incorporation, and the like of the fifth drive board 535 and the sixth drive board 536 without removing the motor unit 301c and the motor unit 301d.

The internal configuration of the fourth arm 14 has been described as above. As described above, the robot 100 includes the fifth drive board 535 that is disposed inside the robot arm 10 and drives the fifth drive unit 35 as the "drive unit" (see FIGS. 8 and 11). Specifically, the robot 100 includes the fifth drive unit 35 and the fifth drive board 535, for driving the fifth arm 15, which are positioned inside the fourth arm 14 of the robot arm 10 and positioned closer to the tip end side than the fourth arm 14. Similarly, the robot 100 includes the sixth drive board 536 that is disposed inside the robot arm 10 and drives the sixth drive unit 36 as a "drive unit" (see FIGS. 8 and 11). Specifically, the robot 100 includes the sixth drive unit 36 and the sixth drive board 536, for driving the sixth arm 16, which are positioned inside the fourth arm 14 of the robot arm 10 and positioned closer to the tip end side than the fourth arm 14.

With this configuration, since the fifth drive board 535 can be disposed in the vicinity of the fifth drive unit 35, electrical connection between the fifth drive board 535 and the fifth drive unit 35 can be made easier. Similarly, since the sixth drive board 536 can be disposed in the vicinity of the sixth drive unit 36, electrical connection between the sixth drive board 536 and the sixth drive unit 36 can be made easier.

As described above, the fifth drive unit 35 is attached to the housing 145 and the fifth drive board 535 is attached to the cover 146. Similarly, the sixth drive unit 36 is attached to the housing 145 and the sixth drive board 536 is attached to the cover 146.

With this configuration, by removing the cover 146 from the housing 145, replacement of the fifth drive board 535 and the sixth drive board 536 can be easily performed. For that reason, compared with the case where the fifth drive board 535 and the sixth drive board 536 are installed in the housing 145 and the motor units 301a and 301b, assemblability and maintainability of the fifth drive board 535 and the sixth drive board 536 can be improved.

The motor units 301a and 301b are attached to the housing 145 and the fifth drive board 535 and the sixth drive board 536 are attached to the cover 146 so as to make it possible to disperse heat generated from the motor units 301a and 301b and the fifth drive board 535 and the sixth drive board 536. Also, these heat transfer paths can be separated. For that reason, heat dissipation performance can be enhanced.

In the description described above, the case where the fifth drive board 535 and the sixth drive board 536 are attached to the cover 146 has been described as an example, but the same configuration can be adopted in the other drive unit 30.

Second Embodiment

Next, a second embodiment of the invention will be described.

Figure 13:
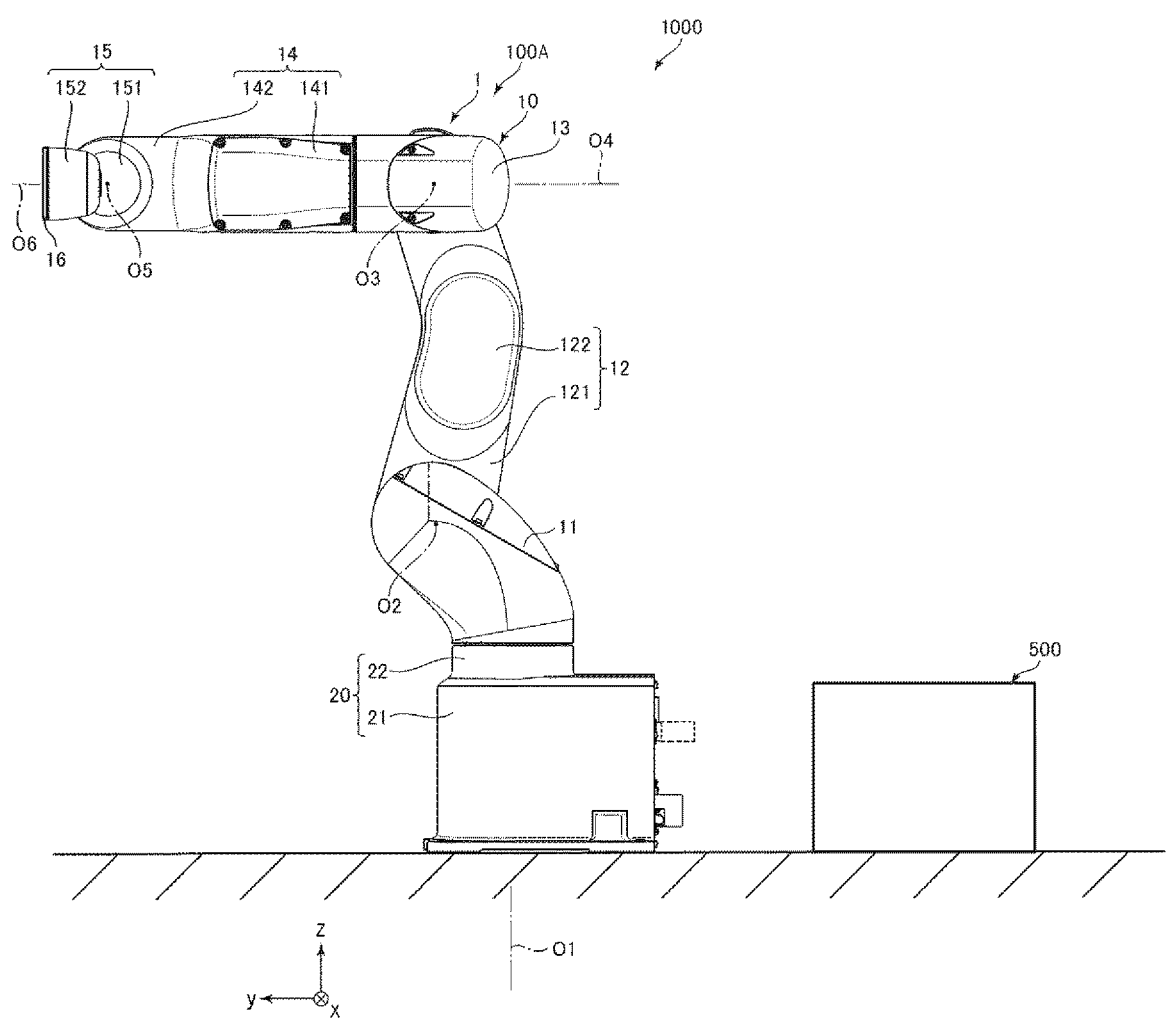
FIG. 13 is a view schematically illustrating a robot system partially according to a second embodiment.
Figure 14:
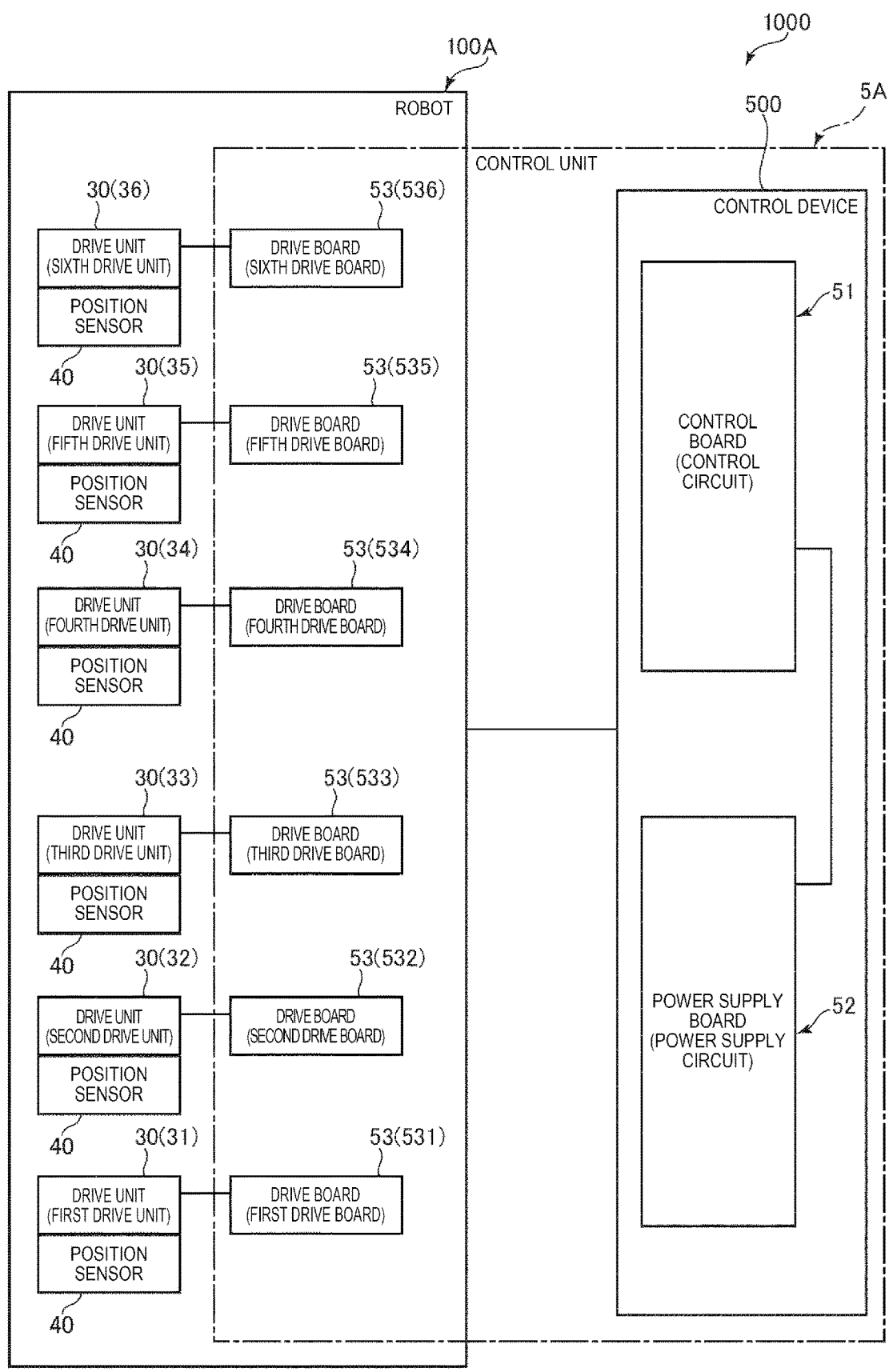
FIG. 14 is a block diagram of the robot system illustrated in FIG. 13.

FIG. 13 is a view schematically illustrating a robot system partially according to a second embodiment. FIG. 14 is a block diagram of the robot system illustrated in FIG. 13.

This embodiment is mainly the same as the embodiment (robot 100) described above except that the control device (controller) configured to include the control board and the power supply board is mainly provided separately from the robot main body (robot). In the following description, with respect to the second embodiment, differences from the embodiment described above will be mainly described, and description of the same matters will be omitted or made briefly using the same reference numerals.

As illustrated in FIG. 13 and FIG. 14, in the embodiment, a control device 500 (controller) is provided separately from the robot 100A. In the embodiment, a description will be made on a robot system 1000 which includes a robot 100A and a control device 500 (controller) provided separately therefrom.

The robot system 1000 includes a robot 100A including the robot main body 1, the plurality of drive units 30, the plurality of position sensors 40, and a plurality of drive boards 53, and the control device 500 including the control board 51 and the power supply board 52. The robot 100A and the control device 500 may be interconnected in a wired or wireless connection manner. The control device 500 and the plurality of drive boards 53 constitute a control unit 5A. The control unit 5A exhibits the same function as the control unit 5 in the first embodiment.

Such a robot system 1000 includes the robot 100A including the robot main body 1 having the base 20 and the robot arm 10 rotatably connected to the base 20, the second drive unit 32 that is disposed inside the robot arm 10 and drives the robot arm 10 (specifically, second arm 12 of the robot arm 10) as a "drive unit", and the wiring 401 that is disposed inside the robot arm 10 and electrically connected to the second drive unit 32; and the control device 500 which is provided separately from the robot 100A and includes the control board 51 and the power supply board 52 for supplying electric power to the control board 51. The robot arm 10 (specifically, second arm 12) includes the casing 212 including the housing 125 as a "main body" and the cover 126 detachably connected to the housing 125. The second drive unit 32 includes the first pulley 303a, the second pulley 304a having the hollow hole 3041a, the belt 305a connecting the first pulley 303a and the second pulley 304a, and a motor (motor unit 301a including the motor) that generates a driving force for driving the robot arm 10 and rotates the first pulley 303a or the second pulley 304a by the driving force. The wiring 401 (cable 400) includes the insertion area 41a inserted through the hollow hole 3041a of the second pulley 304a and the intersection area 43a intersecting with the belt 305a as seen in a direction along a rotation axis of the second pulley 304a, and the intersection area 43a is positioned between the belt 305a and the housing 125.

Similarly, in the embodiment, the third drive unit 33 (drive unit) which is disposed inside the robot arm 10 and drives the robot arm 10 (specifically, the third arm 13 of the robot arm 10) is provided as a "drive unit". The third drive unit 33 includes the first pulley 303b, the second pulley 304b having the hollow hole 3041b, the belt 305b connecting the first pulley 303b and the second pulley 304b, the motor unit 301b that generates a driving force for driving the robot arm 10 and rotates the first pulley 303b or the second pulley 304b by the driving force. The wiring 401 (cable 400) includes the insertion area 41b inserted through the hollow hole 3041b of the second pulley 304b and the intersection area 43b intersecting with the belt 305b as seen in a direction along a rotation axis of the second pulley 304b, and the intersection area 43b is positioned between the belt 305b and the housing 125.

Even with such a robot system 1000, similarly to the first embodiment, replacement of the belts 305a and 305b can be easily performed without removing the cable 400, and assemblability of the second drive unit 32 and the third drive unit 33 can be enhanced, so that maintenance can be performed more easily.

Although the robot and the robot system according to the invention have been described based on the illustrated embodiments, the invention is not limited thereto, and the configuration of each portion can be replaced with any configuration having the same function. Any other constituent element may be added to the invention. Further, each embodiment may be appropriately combined.

In the embodiments described above, the single-arm robot is exemplified as the robot according to the invention, but the robot is not limited to the single-arm robot, and may be another robot such as a dual-arm robot or the like. For example, two or more robot arms may be provided to the base.

Further, in the embodiments described above, the second arm constitutes the A arm and the third arm constitutes the B arm, but the A arm and the B arm are not limited thereto.

The entire disclosure of Japanese Patent Application No. 2017-213522, filed Nov. 6, 2017, is expressly incorporated by reference herein.

What is claimed is:

1. A robot comprising:
   a robot main body that includes a base and a robot arm that is rotatable with respect to the base;
   a drive unit that is disposed inside the robot arm and drives the robot arm; and
   a wiring that is disposed inside the robot arm and electrically connected to the drive unit,
   wherein the robot arm includes a casing including a main body and a cover detachably connected to the main body,
   the drive unit includes a first pulley, a second pulley having a hollow hole, a belt connecting the first pulley and the second pulley, and a motor that generates a driving force for driving the robot arm and rotates the first pulley or the second pulley by the driving force,
   the wiring includes an insertion area inserted through the hollow hole of the second pulley and an intersection area intersecting with the belt as seen in a direction along a rotation axis of the second pulley,
   the intersection area is positioned between the belt and the main body, and
   the main body is provided with a first fixture that fixes the wiring and is disposed inside the belt and a second fixture that fixes the wiring and is disposed outside the belt, as seen in the direction along a rotation axis of the second pulley.

2. The robot according to claim 1,
   wherein the drive unit includes a reduction gear having a through-hole through which the wiring is inserted,
   the first pulley is attached to the motor,
   the second pulley is attached to the reduction gear so that the hollow hole and the through-hole communicate with each other, and
   the motor and the reduction gear are positioned on a side of the main body with respect to the belt.

3. The robot according to claim 1,
   wherein the robot arm includes an A arm including the casing, a B arm connected to the A arm and rotating with respect to the A arm, a drive unit for the A arm which serves as the drive unit and drives the A arm, and a drive unit for the B arm which serves as the drive unit and drives the B arm, and the drive unit for the A arm and the drive unit for the B arm are provided on the A arm.

4. The robot according to claim 1, further comprising:

a control board and a power supply board that supplies electric power to the control board, which are provided in the robot main body.

5. A robot comprising:

a robot main body that includes a base and a robot arm that is rotatable with respect to the base;

a drive unit that is disposed inside the robot arm and drives the robot arm;

a wiring that is disposed inside the robot arm and electrically connected to the drive unit; and a drive board that is disposed inside the robot arm and drives the drive unit, wherein the robot arm includes a casing including a main body and a cover detachably connected to the main body, the drive unit includes a first pulley, a second pulley having a hollow hole, a belt connecting the first pulley and the second pulley, and a motor that generates a driving force for driving the robot arm and rotates the first pulley or the second pulley by the driving force, the wiring includes an insertion area inserted through the hollow hole of the second pulley and an intersection area intersecting with the belt as seen in a direction along a rotation axis of the second pulley, the intersection area is positioned between the belt and the main body, the drive unit is attached to the main body, and the drive board is attached to the cover.

6. A robot system, comprising:

a robot that includes a robot main body that includes a base and a robot arm rotating with respect to the base, a drive unit that is disposed inside the robot arm and drives the robot arm, and a wiring that is disposed inside the robot arm and electrically connected to the drive unit; and a control device that is provided separately from the robot and includes a control board and a power supply board for supplying electric power to the control board, wherein the robot arm includes a casing including a main body and a cover detachably connected to the main body, the drive unit includes a first pulley, a second pulley having a hollow hole, a belt connecting the first pulley and the second pulley, and a motor that generates a driving force for driving the robot arm and rotates the first pulley or the second pulley by the driving force, the wiring includes an insertion area inserted through the hollow hole of the second pulley and an intersection fixture intersecting with the belt as seen in a direction along a rotation axis of the second pulley, the intersection area is positioned between the belt and the main body, and the main body is provided with a first fixture which serves as the fixture and is disposed inside the belt and a second fixture which serves as the fixture and is disposed outside the belt, as seen in the direction along a rotation axis of the second pulley.

7. The robot system according to claim 6, wherein the drive unit includes a reduction gear having a through-hole through which the wiring is inserted, the first pulley is attached to the motor, the second pulley is attached to the reduction gear so that the hollow hole and the through-hole communicate with each other, and the motor and the reduction gear are positioned on a side of the main body with respect to the belt.

8. The robot system according to claim 6, wherein the robot arm includes an A arm including the casing, a B arm connected to the A arm and rotating with respect to the A arm, a drive unit for the A arm which serves as the drive unit and drives the A arm, and a drive unit for the B arm which serves as the drive unit and drives the B arm, and the drive unit for the A arm and the drive unit for the B arm are provided on the A arm.

9. The robot system according to claim 6, further comprising:

a drive board that is disposed inside the robot arm and drives the drive unit.

10. The robot system according to claim 9, wherein the drive unit is attached to the main body, and the drive board is attached to the cover.

* * * * *